(12) United States Patent
Sun et al.

(10) Patent No.: US 8,517,664 B2
(45) Date of Patent: Aug. 27, 2013

(54) TURBOCHARGER

(75) Inventors: Harold Huimin Sun, West Bloomfield, MI (US); Dave Hanna, Troy, MI (US); Jizhong Zhang, West Bloomfield, MI (US); Liangjun Hu, West Bloomfield, MI (US); Eric M. Krivitzky, Brownsville, VT (US); Louis M. Larosiliere, Quechee, VT (US); Nicholas C. Baines, Kidlington (GB)

(73) Assignee: Ford Global Technologies, LLC, Dearborn, MI (US)

( * ) Notice: Subject to any disclaimer, the term of this patent is extended or adjusted under 35 U.S.C. 154(b) by 892 days.

(21) Appl. No.: 12/689,673

(22) Filed: Jan. 19, 2010

(65) Prior Publication Data
US 2011/0173975 A1 Jul. 21, 2011

(51) Int. Cl.
*F04D 27/02* (2006.01)
(52) U.S. Cl.
USPC .......................... 415/58.4; 415/126; 416/182
(58) Field of Classification Search
USPC ...... 415/58.4, 56.4, 58.2, 123, 151; 416/182, 416/DIG. 5
See application file for complete search history.

(56) References Cited

U.S. PATENT DOCUMENTS

| 3,904,308 | A | * | 9/1975 | Ribaud | 415/143 |
| 4,093,401 | A | * | 6/1978 | Gravelle | 416/185 |
| 4,930,978 | A | | 6/1990 | Khanna et al. | |
| 6,508,626 | B1 | * | 1/2003 | Sakurai et al. | 416/180 |
| 6,648,594 | B1 | * | 11/2003 | Horner et al. | 415/145 |
| 6,651,431 | B1 | | 11/2003 | Yang et al. | |
| 8,307,648 | B2 | * | 11/2012 | Sumser et al. | 60/611 |
| 2008/0170938 | A1 | * | 7/2008 | Shinohara | 415/208.1 |
| 2009/0060708 | A1 | * | 3/2009 | Hale | 415/58.2 |

FOREIGN PATENT DOCUMENTS
GB 2 412 695 10/2005

* cited by examiner

*Primary Examiner* — Dwayne J White
(74) *Attorney, Agent, or Firm* — Julia Voutyras; Alleman Hall McCoy Russell & Tuttle LLP

(57) ABSTRACT

In one example, a turbocharger for an internal combustion engine is described. The turbocharger comprises a casing containing an impeller having a full blade coupled to a hub that rotates about an axis of rotation. The casing includes a bleed port and an injection port. The full blade includes a hub edge, a casing edge, and a first distribution of angles, each angle measured between the axis of rotation and a mean line at the hub edge at a meridional distance along the hub edge. The full blade includes a second distribution of angles, each angle measured between the axis of rotation and a mean line at the casing edge at a meridional distance along the casing edge. Further, various systems are described for affecting the aerodynamic properties of the compressor and turbine components in a way that may extend the operating range of the turbocharger.

20 Claims, 16 Drawing Sheets

| % M | Thickness | Angle |
| --- | --- | --- |
| 0 | 1.200 | -36.00 |
| 1.101 | 1.310 | -35.30 |
| 2.202 | 1.430 | -34.60 |
| 3.303 | 1.550 | -34.00 |
| 4.404 | 1.670 | -33.30 |
| 5.504 | 1.790 | -32.70 |
| 6.605 | 1.920 | -32.00 |
| 7.706 | 2.040 | -31.40 |
| 8.807 | 2.170 | -30.80 |
| 9.908 | 2.290 | -30.20 |
| 11.009 | 2.420 | -29.70 |
| 12.11 | 2.540 | -29.10 |
| 13.211 | 2.660 | -28.50 |
| 14.312 | 2.770 | -28.00 |
| 15.412 | 2.880 | -27.50 |
| 16.513 | 2.990 | -26.90 |
| 17.614 | 3.090 | -26.40 |
| 18.715 | 3.190 | -25.90 |
| 19.816 | 3.280 | -25.40 |
| 20.917 | 3.360 | -24.90 |
| 22.018 | 3.430 | -24.40 |
| 22.925 | 3.490 | -24.00 |
| 23.833 | 3.540 | -23.70 |
| 24.741 | 3.590 | -23.30 |
| 25.648 | 3.630 | -22.90 |
| 26.694 | 3.670 | -22.50 |
| 27.74 | 3.700 | -22.10 |
| 28.786 | 3.730 | -21.70 |
| 29.832 | 3.750 | -21.30 |
| 30.877 | 3.760 | -20.90 |
| 31.923 | 3.770 | -20.50 |
| 32.969 | 3.770 | -20.10 |
| 34.015 | 3.760 | -19.70 |

| % M | Thickness | Angle |
| --- | --- | --- |
| 35.06 | 3.750 | -19.40 |
| 36.106 | 3.730 | -19.00 |
| 37.152 | 3.700 | -18.70 |
| 38.198 | 3.670 | -18.40 |
| 39.244 | 3.640 | -18.10 |
| 40.289 | 3.600 | -17.80 |
| 41.335 | 3.550 | -17.50 |
| 42.381 | 3.500 | -17.20 |
| 43.427 | 3.450 | -16.90 |
| 44.473 | 3.390 | -16.60 |
| 45.518 | 3.330 | -16.40 |
| 46.564 | 3.270 | -16.20 |
| 47.61 | 3.200 | -16.00 |
| 48.656 | 3.130 | -15.80 |
| 49.702 | 3.060 | -15.60 |
| 50.747 | 2.990 | -15.40 |
| 51.793 | 2.920 | -15.20 |
| 52.839 | 2.850 | -15.10 |
| 53.885 | 2.780 | -15.00 |
| 54.931 | 2.710 | -14.90 |
| 55.976 | 2.640 | -14.80 |
| 57.022 | 2.570 | -14.80 |
| 58.068 | 2.500 | -14.80 |
| 59.114 | 2.430 | -14.70 |
| 60.16 | 2.370 | -14.80 |
| 61.317 | 2.300 | -14.80 |
| 62.475 | 2.230 | -14.90 |
| 63.632 | 2.160 | -15.00 |
| 64.79 | 2.100 | -15.20 |
| 65.948 | 2.040 | -15.30 |
| 67.105 | 1.980 | -15.60 |
| 68.263 | 1.930 | -15.80 |
| 69.42 | 1.880 | -16.10 |

| % M | Thickness | Angle |
| --- | --- | --- |
| 70.578 | 1.840 | -16.40 |
| 71.736 | 1.790 | -16.80 |
| 72.893 | 1.750 | -17.20 |
| 74.051 | 1.720 | -17.70 |
| 75.208 | 1.690 | -18.20 |
| 76.366 | 1.660 | -18.70 |
| 77.524 | 1.630 | -19.30 |
| 78.681 | 1.610 | -19.90 |
| 79.839 | 1.590 | -20.50 |
| 80.636 | 1.580 | -21.00 |
| 81.433 | 1.570 | -21.40 |
| 82.23 | 1.560 | -21.90 |
| 83.026 | 1.550 | -22.50 |
| 83.928 | 1.540 | -23.10 |
| 84.829 | 1.530 | -23.70 |
| 85.73 | 1.520 | -24.30 |
| 86.631 | 1.520 | -25.00 |
| 87.533 | 1.510 | -25.70 |
| 88.434 | 1.510 | -26.40 |
| 89.335 | 1.510 | -27.10 |
| 90.236 | 1.510 | -27.80 |
| 91.137 | 1.500 | -28.60 |
| 92.039 | 1.500 | -29.40 |
| 92.94 | 1.500 | -30.10 |
| 93.841 | 1.500 | -30.90 |
| 94.525 | 1.500 | -31.50 |
| 95.21 | 1.500 | -32.20 |
| 95.894 | 1.500 | -32.80 |
| 96.578 | 1.500 | -33.40 |
| 97.263 | 1.500 | -34.10 |
| 97.947 | 1.500 | -34.70 |
| 98.631 | 1.500 | -35.40 |
| 99.316 | 1.500 | -36.00 |
| 100 | 1.500 | -36.70 |

FIG. 4A

| % M | Thickness | Angle | % M | Thickness | Angle | % M | Thickness | Angle |
|---|---|---|---|---|---|---|---|---|
| 0 | 0.971 | -57.10 | 36.659 | 2.050 | -34.90 | 70.948 | 1.040 | -25.80 |
| 1.174 | 1.040 | -56.10 | 37.709 | 2.010 | -34.20 | 71.982 | 1.030 | -26.10 |
| 2.347 | 1.120 | -55.10 | 38.758 | 1.980 | -33.50 | 73.017 | 1.010 | -26.20 |
| 3.52 | 1.190 | -54.30 | 39.806 | 1.940 | -32.90 | 74.055 | 1.000 | -26.50 |
| 4.692 | 1.270 | -53.50 | 40.853 | 1.910 | -32.30 | 75.095 | 0.988 | -26.70 |
| 5.864 | 1.350 | -52.80 | 41.899 | 1.870 | -31.70 | 76.137 | 0.976 | -27.00 |
| 7.035 | 1.430 | -52.20 | 42.944 | 1.830 | -31.10 | 77.181 | 0.965 | -27.30 |
| 8.205 | 1.510 | -51.60 | 43.989 | 1.790 | -30.50 | 78.227 | 0.954 | -27.60 |
| 9.374 | 1.590 | -51.10 | 45.033 | 1.750 | -30.00 | 79.275 | 0.945 | -27.90 |
| 10.542 | 1.660 | -50.60 | 46.076 | 1.710 | -29.50 | 80.098 | 0.938 | -28.20 |
| 11.709 | 1.740 | -50.00 | 47.119 | 1.680 | -29.10 | 80.92 | 0.933 | -28.50 |
| 12.876 | 1.810 | -49.60 | 48.161 | 1.640 | -28.60 | 81.744 | 0.926 | -28.80 |
| 14.041 | 1.880 | -49.00 | 49.203 | 1.600 | -28.20 | 82.568 | 0.920 | -29.10 |
| 15.206 | 1.940 | -48.50 | 50.245 | 1.560 | -27.80 | 83.467 | 0.914 | -29.40 |
| 16.37 | 2.000 | -47.90 | 51.287 | 1.530 | -27.40 | 84.367 | 0.909 | -29.80 |
| 17.534 | 2.050 | -47.40 | 52.329 | 1.490 | -27.10 | 85.268 | 0.905 | -30.10 |
| 18.697 | 2.090 | -46.70 | 53.371 | 1.460 | -26.80 | 86.169 | 0.900 | -30.60 |
| 19.86 | 2.130 | -46.10 | 54.414 | 1.430 | -26.50 | 87.071 | 0.897 | -30.90 |
| 21.022 | 2.160 | -45.40 | 55.457 | 1.390 | -26.30 | 87.973 | 0.893 | -31.30 |
| 22.184 | 2.190 | -44.70 | 56.5 | 1.360 | -26.10 | 88.876 | 0.891 | -31.80 |
| 23.345 | 2.210 | -44.10 | 57.545 | 1.330 | -25.90 | 89.779 | 0.888 | -32.20 |
| 24.301 | 2.220 | -43.50 | 58.59 | 1.300 | -25.70 | 90.683 | 0.888 | -32.60 |
| 25.257 | 2.230 | -42.80 | 59.635 | 1.270 | -25.50 | 91.587 | 0.885 | -33.10 |
| 26.213 | 2.230 | -42.20 | 60.682 | 1.250 | -25.40 | 92.492 | 0.884 | -33.50 |
| 27.168 | 2.230 | -41.40 | 61.73 | 1.220 | -25.30 | 93.397 | 0.883 | -34.00 |
| 28.226 | 2.220 | -40.70 | 62.747 | 1.200 | -25.30 | 94.13 | 0.884 | -34.30 |
| 29.283 | 2.210 | -40.00 | 63.766 | 1.170 | -25.30 | 94.863 | 0.882 | -34.70 |
| 30.339 | 2.200 | -39.20 | 64.787 | 1.150 | -25.30 | 95.597 | 0.883 | -35.10 |
| 31.395 | 2.180 | -38.50 | 65.81 | 1.130 | -25.30 | 96.33 | 0.883 | -35.40 |
| 32.45 | 2.160 | -37.70 | 66.834 | 1.110 | -25.40 | 97.064 | 0.883 | -35.80 |
| 33.503 | 2.130 | -37.00 | 67.859 | 1.090 | -25.50 | 97.797 | 0.883 | -36.10 |
| 34.556 | 2.110 | -36.30 | 68.887 | 1.080 | -25.60 | 98.531 | 0.884 | -36.50 |
| 35.608 | 2.080 | -35.60 | 69.917 | 1.060 | -25.70 | 99.266 | 0.884 | -36.60 |
|  |  |  |  |  |  | 100 | 0.885 | -36.80 |

FIG. 4B

| %M | Thickness | Angle |
|---|---|---|
| 0 | 0.350 | -68.00 |
| 1.253 | 0.358 | -68.10 |
| 2.506 | 0.367 | -68.10 |
| 3.759 | 0.375 | -68.20 |
| 5.011 | 0.383 | -68.20 |
| 6.264 | 0.391 | -68.20 |
| 7.517 | 0.399 | -68.20 |
| 8.77 | 0.406 | -68.20 |
| 10.023 | 0.413 | -68.10 |
| 11.276 | 0.420 | -68.10 |
| 12.529 | 0.426 | -68.00 |
| 13.781 | 0.432 | -67.90 |
| 15.034 | 0.438 | -67.70 |
| 16.287 | 0.443 | -67.60 |
| 17.54 | 0.448 | -67.40 |
| 18.793 | 0.453 | -67.10 |
| 20.046 | 0.457 | -66.80 |
| 21.299 | 0.461 | -66.50 |
| 22.551 | 0.465 | -66.10 |
| 23.804 | 0.469 | -65.70 |
| 25.057 | 0.472 | -65.20 |
| 26.089 | 0.474 | -64.80 |
| 27.12 | 0.477 | -64.30 |
| 28.152 | 0.479 | -63.80 |
| 29.183 | 0.481 | -63.20 |
| 30.264 | 0.483 | -62.60 |
| 31.345 | 0.484 | -61.90 |
| 32.426 | 0.486 | -61.20 |
| 33.506 | 0.488 | -60.50 |
| 34.587 | 0.489 | -59.70 |
| 35.668 | 0.490 | -58.80 |
| 36.748 | 0.491 | -58.00 |
| 37.829 | 0.492 | -57.10 |
| 38.91 | 0.493 | -56.20 |
| 39.991 | 0.494 | -55.20 |
| 41.071 | 0.495 | -54.30 |
| 42.152 | 0.495 | -53.30 |
| 43.233 | 0.496 | -52.40 |
| 44.313 | 0.496 | -51.40 |
| 45.394 | 0.497 | -50.40 |
| 46.475 | 0.497 | -49.40 |
| 47.556 | 0.497 | -48.50 |
| 48.636 | 0.498 | -47.50 |
| 49.717 | 0.498 | -46.60 |
| 50.798 | 0.498 | -45.70 |
| 51.878 | 0.498 | -44.80 |
| 52.959 | 0.498 | -43.90 |
| 54.04 | 0.498 | -43.10 |
| 55.121 | 0.498 | -42.30 |
| 56.201 | 0.498 | -41.50 |
| 57.282 | 0.498 | -40.80 |
| 58.363 | 0.498 | -40.10 |
| 59.443 | 0.498 | -39.40 |
| 60.524 | 0.498 | -38.80 |
| 61.605 | 0.497 | -38.20 |
| 62.685 | 0.497 | -37.60 |
| 63.766 | 0.497 | -37.10 |
| 64.847 | 0.496 | -36.60 |
| 65.688 | 0.496 | -36.20 |
| 66.528 | 0.496 | -35.90 |
| 67.369 | 0.495 | -35.50 |
| 68.21 | 0.495 | -35.20 |
| 69.05 | 0.495 | -35.00 |
| 69.891 | 0.494 | -34.70 |
| 70.732 | 0.494 | -34.50 |
| 71.572 | 0.493 | -34.30 |
| 72.413 | 0.493 | -34.10 |
| 73.254 | 0.492 | -33.90 |
| 74.095 | 0.491 | -33.70 |
| 74.935 | 0.491 | -33.60 |
| 75.776 | 0.490 | -33.50 |
| 76.617 | 0.489 | -33.40 |
| 77.457 | 0.488 | -33.30 |
| 78.298 | 0.488 | -33.20 |
| 79.139 | 0.487 | -33.20 |
| 79.984 | 0.486 | -33.10 |
| 80.829 | 0.485 | -33.10 |
| 81.674 | 0.484 | -33.10 |
| 82.52 | 0.483 | -33.20 |
| 83.387 | 0.482 | -33.20 |
| 84.255 | 0.480 | -33.30 |
| 85.123 | 0.479 | -33.40 |
| 85.991 | 0.478 | -33.50 |
| 86.858 | 0.476 | -33.60 |
| 87.726 | 0.475 | -33.70 |
| 88.594 | 0.473 | -33.80 |
| 89.461 | 0.472 | -34.00 |
| 90.329 | 0.470 | -34.20 |
| 91.197 | 0.469 | -34.40 |
| 92.064 | 0.467 | -34.50 |
| 92.932 | 0.465 | -34.70 |
| 93.717 | 0.464 | -34.90 |
| 94.503 | 0.462 | -35.10 |
| 95.288 | 0.460 | -35.30 |
| 96.073 | 0.459 | -35.50 |
| 96.859 | 0.457 | -35.70 |
| 97.644 | 0.455 | -36.00 |
| 98.429 | 0.454 | -36.20 |
| 99.215 | 0.452 | -36.40 |
| 100 | 0.450 | -36.70 |

FIG. 4C

| % M | Thickness | Angle | % M | Thickness | Angle |
|---|---|---|---|---|---|
| 25.648 | 1.000 | -27.50 | 65.948 | 1.610 | -13.20 |
| 26.694 | 1.070 | -26.60 | 67.105 | 1.600 | -13.40 |
| 27.74 | 1.130 | -25.80 | 68.263 | 1.590 | -13.60 |
| 28.786 | 1.200 | -25.00 | 69.42 | 1.580 | -13.80 |
| 29.832 | 1.260 | -24.30 | 70.578 | 1.570 | -14.20 |
| 30.877 | 1.310 | -23.50 | 71.736 | 1.560 | -14.50 |
| 31.923 | 1.370 | -22.80 | 72.893 | 1.550 | -14.90 |
| 32.969 | 1.420 | -22.20 | 74.051 | 1.540 | -15.40 |
| 34.015 | 1.470 | -21.60 | 75.208 | 1.530 | -15.90 |
| 35.06 | 1.510 | -21.00 | 76.366 | 1.530 | -16.50 |
| 36.106 | 1.560 | -20.40 | 77.524 | 1.520 | -17.10 |
| 37.152 | 1.590 | -19.80 | 78.681 | 1.520 | -17.80 |
| 38.198 | 1.630 | -19.30 | 79.839 | 1.510 | -18.60 |
| 39.244 | 1.660 | -18.80 | 80.636 | 1.510 | -19.10 |
| 40.289 | 1.690 | -18.30 | 81.433 | 1.510 | -19.70 |
| 41.335 | 1.720 | -17.90 | 82.23 | 1.510 | -20.30 |
| 42.381 | 1.740 | -17.40 | 83.026 | 1.510 | -20.90 |
| 43.427 | 1.760 | -17.00 | 83.928 | 1.500 | -21.60 |
| 44.473 | 1.770 | -16.60 | 84.829 | 1.500 | -22.40 |
| 45.518 | 1.780 | -16.20 | 85.73 | 1.500 | -23.20 |
| 46.564 | 1.790 | -15.90 | 86.631 | 1.500 | -24.00 |
| 47.61 | 1.790 | -15.50 | 87.533 | 1.500 | -24.80 |
| 48.656 | 1.800 | -15.20 | 88.434 | 1.500 | -25.60 |
| 49.702 | 1.790 | -14.90 | 89.335 | 1.500 | -26.50 |
| 50.747 | 1.790 | -14.60 | 90.236 | 1.500 | -27.40 |
| 51.793 | 1.790 | -14.40 | 91.137 | 1.500 | -28.20 |
| 52.839 | 1.780 | -14.10 | 92.039 | 1.500 | -29.10 |
| 53.885 | 1.770 | -13.90 | 92.94 | 1.500 | -30.00 |
| 54.931 | 1.760 | -13.70 | 93.841 | 1.500 | -30.90 |
| 55.976 | 1.740 | -13.50 | 94.525 | 1.500 | -31.50 |
| 57.022 | 1.730 | -13.40 | 95.21 | 1.500 | -32.20 |
| 58.068 | 1.720 | -13.20 | 95.894 | 1.500 | -32.80 |
| 59.114 | 1.700 | -13.10 | 96.578 | 1.500 | -33.40 |
| 60.16 | 1.690 | -13.10 | 97.263 | 1.500 | -34.10 |
| 61.317 | 1.670 | -13.00 | 97.947 | 1.500 | -34.70 |
| 62.475 | 1.660 | -13.00 | 98.631 | 1.500 | -35.40 |
| 63.632 | 1.640 | -13.00 | 99.316 | 1.500 | -36.00 |
| 64.79 | 1.630 | -13.10 | 100 | 1.500 | -36.70 |

FIG. 4D

| % M | Thickness | Angle | % M | Thickness | Angle |
|---|---|---|---|---|---|
| 27.168 | 0.696 | -45.30 | 66.834 | 0.964 | -23.90 |
| 28.226 | 0.729 | -44.50 | 67.859 | 0.958 | -24.00 |
| 29.283 | 0.760 | -43.50 | 68.887 | 0.952 | -24.10 |
| 30.339 | 0.789 | -42.60 | 69.917 | 0.946 | -24.30 |
| 31.395 | 0.817 | -41.60 | 70.948 | 0.942 | -24.40 |
| 32.45 | 0.844 | -40.60 | 71.982 | 0.936 | -24.70 |
| 33.503 | 0.869 | -39.60 | 73.017 | 0.931 | -24.90 |
| 34.556 | 0.892 | -38.60 | 74.055 | 0.926 | -25.20 |
| 35.608 | 0.914 | -37.60 | 75.095 | 0.921 | -25.40 |
| 36.659 | 0.934 | -36.60 | 76.137 | 0.918 | -25.70 |
| 37.709 | 0.953 | -35.60 | 77.181 | 0.913 | -26.00 |
| 38.758 | 0.970 | -34.70 | 78.227 | 0.908 | -26.40 |
| 39.806 | 0.985 | -33.80 | 79.275 | 0.905 | -26.70 |
| 40.853 | 0.999 | -32.90 | 80.098 | 0.902 | -27.10 |
| 41.899 | 1.010 | -32.00 | 80.92 | 0.899 | -27.30 |
| 42.944 | 1.020 | -31.20 | 81.744 | 0.897 | -27.70 |
| 43.989 | 1.030 | -30.50 | 82.568 | 0.894 | -28.00 |
| 45.033 | 1.040 | -29.80 | 83.467 | 0.892 | -28.40 |
| 46.076 | 1.040 | -29.10 | 84.367 | 0.890 | -28.80 |
| 47.119 | 1.040 | -28.50 | 85.268 | 0.887 | -29.20 |
| 48.161 | 1.040 | -27.90 | 86.169 | 0.885 | -29.60 |
| 49.203 | 1.040 | -27.30 | 87.071 | 0.883 | -30.00 |
| 50.245 | 1.040 | -26.80 | 87.973 | 0.882 | -30.50 |
| 51.287 | 1.040 | -26.40 | 88.876 | 0.880 | -30.90 |
| 52.329 | 1.040 | -26.00 | 89.779 | 0.879 | -31.40 |
| 53.371 | 1.040 | -25.60 | 90.683 | 0.878 | -31.90 |
| 54.414 | 1.030 | -25.20 | 91.587 | 0.876 | -32.40 |
| 55.457 | 1.030 | -24.90 | 92.492 | 0.876 | -32.80 |
| 56.5 | 1.020 | -24.70 | 93.397 | 0.875 | -33.30 |
| 57.545 | 1.020 | -24.40 | 94.13 | 0.874 | -33.70 |
| 58.59 | 1.010 | -24.20 | 94.863 | 0.874 | -34.10 |
| 59.635 | 1.010 | -24.10 | 95.597 | 0.874 | -34.50 |
| 60.682 | 1.000 | -23.90 | 96.33 | 0.874 | -34.90 |
| 61.73 | 0.994 | -23.80 | 97.064 | 0.874 | -35.20 |
| 62.747 | 0.988 | -23.70 | 97.797 | 0.874 | -35.60 |
| 63.766 | 0.982 | -23.70 | 98.531 | 0.874 | -35.90 |
| 64.787 | 0.975 | -23.70 | 99.266 | 0.874 | -36.10 |
| 65.81 | 0.969 | -23.80 | 100 | 0.874 | -36.30 |

FIG. 4E

| % M | Thickness | Angle | % M | Thickness | Angle |
|---|---|---|---|---|---|
| 29.183 | 0.350 | -67.50 | 69.05 | 0.494 | -34.10 |
| 30.264 | 0.357 | -67.60 | 69.891 | 0.493 | -33.70 |
| 31.345 | 0.365 | -67.60 | 70.732 | 0.493 | -33.40 |
| 32.426 | 0.373 | -67.40 | 71.572 | 0.492 | -33.10 |
| 33.506 | 0.381 | -67.10 | 72.413 | 0.492 | -32.90 |
| 34.587 | 0.388 | -66.60 | 73.254 | 0.491 | -32.60 |
| 35.668 | 0.396 | -66.00 | 74.095 | 0.490 | -32.40 |
| 36.748 | 0.403 | -65.30 | 74.935 | 0.489 | -32.30 |
| 37.829 | 0.410 | -64.50 | 75.776 | 0.489 | -32.10 |
| 38.91 | 0.416 | -63.50 | 76.617 | 0.488 | -32.00 |
| 39.991 | 0.423 | -62.50 | 77.457 | 0.487 | -32.00 |
| 41.071 | 0.429 | -61.40 | 78.298 | 0.486 | -31.90 |
| 42.152 | 0.435 | -60.20 | 79.139 | 0.485 | -31.90 |
| 43.233 | 0.440 | -58.90 | 79.984 | 0.484 | -31.90 |
| 44.313 | 0.446 | -57.60 | 80.829 | 0.483 | -31.90 |
| 45.394 | 0.451 | -56.30 | 81.674 | 0.482 | -32.00 |
| 46.475 | 0.456 | -55.00 | 82.52 | 0.481 | -32.10 |
| 47.556 | 0.460 | -53.70 | 83.387 | 0.480 | -32.20 |
| 48.636 | 0.465 | -52.30 | 84.255 | 0.479 | -32.30 |
| 49.717 | 0.469 | -51.00 | 85.123 | 0.478 | -32.50 |
| 50.798 | 0.473 | -49.70 | 85.991 | 0.477 | -32.60 |
| 51.878 | 0.476 | -48.40 | 86.858 | 0.475 | -32.80 |
| 52.959 | 0.479 | -47.10 | 87.726 | 0.474 | -33.00 |
| 54.04 | 0.482 | -45.90 | 88.594 | 0.472 | -33.30 |
| 55.121 | 0.485 | -44.70 | 89.461 | 0.471 | -33.50 |
| 56.201 | 0.487 | -43.60 | 90.329 | 0.469 | -33.70 |
| 57.282 | 0.489 | -42.50 | 91.197 | 0.468 | -34.00 |
| 58.363 | 0.491 | -41.50 | 92.064 | 0.466 | -34.30 |
| 59.443 | 0.492 | -40.50 | 92.932 | 0.464 | -34.50 |
| 60.524 | 0.494 | -39.50 | 93.717 | 0.463 | -34.80 |
| 61.605 | 0.494 | -38.60 | 94.503 | 0.461 | -35.00 |
| 62.685 | 0.495 | -37.80 | 95.288 | 0.460 | -35.30 |
| 63.766 | 0.495 | -37.00 | 96.073 | 0.458 | -35.50 |
| 64.847 | 0.495 | -36.30 | 96.859 | 0.457 | -35.80 |
| 65.688 | 0.495 | -35.80 | 97.644 | 0.455 | -36.00 |
| 66.528 | 0.495 | -35.30 | 98.429 | 0.454 | -36.30 |
| 67.369 | 0.495 | -34.90 | 99.215 | 0.452 | -36.50 |
| 68.21 | 0.494 | -34.50 | 100 | 0.450 | -36.70 |

FIG. 4F

| % M | Thickness | Angle | % M | Thickness | Angle | % M | Thickness | Angle |
|---|---|---|---|---|---|---|---|---|
| 0 | 0.500 | 28.40 | 33.333 | 1.170 | 19.40 | 66.667 | 2.500 | -7.39 |
| 1.01 | 0.500 | 28.80 | 34.343 | 1.220 | 18.60 | 67.677 | 2.500 | -8.17 |
| 2.02 | 0.500 | 29.20 | 35.354 | 1.280 | 17.80 | 68.687 | 2.490 | -8.96 |
| 3.03 | 0.500 | 29.50 | 36.364 | 1.330 | 16.90 | 69.697 | 2.480 | -9.74 |
| 4.04 | 0.501 | 29.70 | 37.374 | 1.390 | 16.10 | 70.707 | 2.470 | -10.50 |
| 5.051 | 0.502 | 29.90 | 38.384 | 1.450 | 15.30 | 71.717 | 2.460 | -11.30 |
| 6.061 | 0.503 | 30.10 | 39.394 | 1.510 | 14.40 | 72.727 | 2.450 | -12.10 |
| 7.071 | 0.505 | 30.20 | 40.404 | 1.570 | 13.60 | 73.737 | 2.430 | -12.90 |
| 8.081 | 0.507 | 30.30 | 41.414 | 1.630 | 12.70 | 74.747 | 2.410 | -13.80 |
| 9.091 | 0.511 | 30.30 | 42.424 | 1.690 | 11.90 | 75.758 | 2.390 | -14.60 |
| 10.101 | 0.515 | 30.30 | 43.434 | 1.740 | 11.00 | 76.768 | 2.370 | -15.40 |
| 11.111 | 0.521 | 30.20 | 44.444 | 1.800 | 10.20 | 77.778 | 2.350 | -16.20 |
| 12.121 | 0.528 | 30.10 | 45.455 | 1.860 | 9.35 | 78.788 | 2.330 | -17.10 |
| 13.131 | 0.537 | 30.00 | 46.465 | 1.910 | 8.51 | 79.798 | 2.300 | -17.90 |
| 14.141 | 0.547 | 29.80 | 47.475 | 1.970 | 7.67 | 80.808 | 2.280 | -18.70 |
| 15.152 | 0.559 | 29.60 | 48.485 | 2.020 | 6.84 | 81.818 | 2.250 | -19.50 |
| 16.162 | 0.573 | 29.30 | 49.495 | 2.070 | 6.01 | 82.828 | 2.230 | -20.30 |
| 17.172 | 0.589 | 29.00 | 50.505 | 2.120 | 5.19 | 83.838 | 2.200 | -21.10 |
| 18.182 | 0.607 | 28.60 | 51.515 | 2.160 | 4.38 | 84.848 | 2.180 | -21.90 |
| 19.192 | 0.628 | 28.20 | 52.525 | 2.210 | 3.57 | 85.859 | 2.150 | -22.70 |
| 20.202 | 0.651 | 27.80 | 53.535 | 2.250 | 2.76 | 86.869 | 2.130 | -23.40 |
| 21.212 | 0.676 | 27.30 | 54.545 | 2.280 | 1.96 | 87.879 | 2.100 | -24.20 |
| 22.222 | 0.704 | 26.80 | 55.556 | 2.320 | 1.17 | 88.889 | 2.080 | -24.80 |
| 23.232 | 0.734 | 26.30 | 56.566 | 2.350 | 0.38 | 89.899 | 2.050 | -25.50 |
| 24.242 | 0.767 | 25.70 | 57.576 | 2.380 | -0.41 | 90.909 | 2.030 | -26.10 |
| 25.253 | 0.802 | 25.10 | 58.586 | 2.410 | -1.19 | 91.919 | 2.000 | -26.60 |
| 26.263 | 0.840 | 24.50 | 59.596 | 2.430 | -1.97 | 92.929 | 1.980 | -27.10 |
| 27.273 | 0.880 | 23.80 | 60.606 | 2.450 | -2.75 | 93.939 | 1.950 | -27.60 |
| 28.283 | 0.923 | 23.10 | 61.616 | 2.460 | -3.52 | 94.95 | 1.920 | -27.90 |
| 29.293 | 0.968 | 22.40 | 62.626 | 2.480 | -4.30 | 95.96 | 1.890 | -28.30 |
| 30.303 | 1.020 | 21.70 | 63.636 | 2.490 | -5.07 | 96.97 | 1.860 | -28.50 |
| 31.313 | 1.060 | 20.90 | 64.646 | 2.490 | -5.84 | 97.98 | 1.830 | -28.80 |
| 32.323 | 1.120 | 20.20 | 65.657 | 2.500 | -6.62 | 98.99 | 1.790 | -28.90 |
|  |  |  |  |  |  | 100 | 1.750 | -29.10 |

FIG. 6A

| % M | Thickness | Angle |
|---|---|---|
| 0 | 0.500 | 22.50 |
| 1.009 | 0.500 | 22.40 |
| 2.018 | 0.500 | 22.40 |
| 3.027 | 0.500 | 22.30 |
| 4.036 | 0.500 | 22.10 |
| 5.045 | 0.501 | 21.90 |
| 6.055 | 0.501 | 21.70 |
| 7.064 | 0.502 | 21.50 |
| 8.073 | 0.504 | 21.20 |
| 9.083 | 0.505 | 20.90 |
| 10.092 | 0.508 | 20.60 |
| 11.102 | 0.511 | 20.30 |
| 12.111 | 0.514 | 19.90 |
| 13.121 | 0.518 | 19.50 |
| 14.13 | 0.524 | 19.10 |
| 15.14 | 0.530 | 18.60 |
| 16.15 | 0.537 | 18.20 |
| 17.16 | 0.545 | 17.70 |
| 18.169 | 0.554 | 17.20 |
| 19.179 | 0.564 | 16.70 |
| 20.189 | 0.575 | 16.10 |
| 21.199 | 0.588 | 15.60 |
| 22.209 | 0.602 | 15.00 |
| 23.219 | 0.617 | 14.40 |
| 24.229 | 0.633 | 13.80 |
| 25.239 | 0.651 | 13.10 |
| 26.25 | 0.670 | 12.50 |
| 27.26 | 0.690 | 11.80 |
| 28.27 | 0.711 | 11.20 |
| 29.28 | 0.734 | 10.50 |
| 30.29 | 0.757 | 9.79 |
| 31.301 | 0.782 | 9.08 |
| 32.311 | 0.807 | 8.36 |

| % M | Thickness | Angle |
|---|---|---|
| 33.322 | 0.834 | 7.63 |
| 34.332 | 0.861 | 6.89 |
| 35.342 | 0.889 | 6.14 |
| 36.353 | 0.917 | 5.38 |
| 37.363 | 0.946 | 4.61 |
| 38.374 | 0.975 | 3.83 |
| 39.384 | 1.000 | 3.05 |
| 40.395 | 1.030 | 2.25 |
| 41.405 | 1.060 | 1.45 |
| 42.416 | 1.090 | 0.63 |
| 43.427 | 1.120 | -0.19 |
| 44.437 | 1.150 | -1.02 |
| 45.448 | 1.180 | -1.86 |
| 46.458 | 1.210 | -2.70 |
| 47.469 | 1.230 | -3.56 |
| 48.48 | 1.260 | -4.42 |
| 49.49 | 1.280 | -5.29 |
| 50.501 | 1.310 | -6.17 |
| 51.512 | 1.330 | -7.05 |
| 52.522 | 1.350 | -7.95 |
| 53.533 | 1.370 | -8.85 |
| 54.544 | 1.390 | -9.76 |
| 55.554 | 1.410 | -10.70 |
| 56.565 | 1.430 | -11.60 |
| 57.575 | 1.440 | -12.50 |
| 58.586 | 1.450 | -13.50 |
| 59.597 | 1.470 | -14.40 |
| 60.607 | 1.470 | -15.40 |
| 61.618 | 1.480 | -16.40 |
| 62.628 | 1.490 | -17.40 |
| 63.639 | 1.490 | -18.30 |
| 64.649 | 1.500 | -19.30 |
| 65.66 | 1.500 | -20.30 |

| % M | Thickness | Angle |
|---|---|---|
| 66.67 | 1.500 | -21.30 |
| 67.681 | 1.500 | -22.30 |
| 68.691 | 1.500 | -23.40 |
| 69.702 | 1.490 | -24.40 |
| 70.712 | 1.490 | -25.40 |
| 71.722 | 1.480 | -26.40 |
| 72.733 | 1.470 | -27.50 |
| 73.743 | 1.470 | -28.50 |
| 74.753 | 1.460 | -29.50 |
| 75.763 | 1.450 | -30.50 |
| 76.774 | 1.440 | -31.50 |
| 77.784 | 1.430 | -32.50 |
| 78.794 | 1.410 | -33.50 |
| 79.804 | 1.400 | -34.50 |
| 80.814 | 1.390 | -35.40 |
| 81.824 | 1.380 | -36.40 |
| 82.834 | 1.360 | -37.30 |
| 83.844 | 1.350 | -38.20 |
| 84.854 | 1.340 | -39.10 |
| 85.864 | 1.330 | -39.90 |
| 86.874 | 1.310 | -40.70 |
| 87.884 | 1.300 | -41.50 |
| 88.893 | 1.290 | -42.30 |
| 89.903 | 1.280 | -43.00 |
| 90.913 | 1.260 | -43.70 |
| 91.923 | 1.250 | -44.30 |
| 92.932 | 1.240 | -44.90 |
| 93.942 | 1.230 | -45.50 |
| 94.952 | 1.210 | -46.00 |
| 95.961 | 1.200 | -46.40 |
| 96.971 | 1.180 | -46.90 |
| 97.981 | 1.160 | -47.30 |
| 98.99 | 1.150 | -47.60 |
| 100 | 1.120 | -47.60 |

FIG. 6B

| % M | Thickness | Angle | % M | Thickness | Angle | % M | Thickness | Angle |
|---|---|---|---|---|---|---|---|---|
| 0 | 0.500 | 7.18 | 33.58 | 0.500 | -13.20 | 66.879 | 0.500 | -39.90 |
| 1.023 | 0.500 | 6.75 | 34.593 | 0.500 | -14.00 | 67.885 | 0.500 | -40.70 |
| 2.045 | 0.500 | 6.32 | 35.605 | 0.500 | -14.70 | 68.891 | 0.500 | -41.40 |
| 3.068 | 0.500 | 5.86 | 36.618 | 0.500 | -15.50 | 69.896 | 0.500 | -42.20 |
| 4.09 | 0.500 | 5.40 | 37.629 | 0.500 | -16.30 | 70.902 | 0.500 | -42.90 |
| 5.111 | 0.500 | 4.92 | 38.641 | 0.500 | -17.10 | 71.907 | 0.500 | -43.60 |
| 6.132 | 0.500 | 4.42 | 39.652 | 0.500 | -17.90 | 72.912 | 0.500 | -44.30 |
| 7.153 | 0.500 | 3.92 | 40.664 | 0.500 | -18.70 | 73.917 | 0.500 | -45.00 |
| 8.173 | 0.500 | 3.39 | 41.675 | 0.500 | -19.50 | 74.921 | 0.500 | -45.70 |
| 9.193 | 0.500 | 2.86 | 42.685 | 0.500 | -20.40 | 75.926 | 0.500 | -46.40 |
| 10.213 | 0.500 | 2.31 | 43.696 | 0.500 | -21.20 | 76.93 | 0.500 | -47.00 |
| 11.232 | 0.500 | 1.75 | 44.706 | 0.500 | -22.00 | 77.935 | 0.500 | -47.70 |
| 12.251 | 0.500 | 1.18 | 45.716 | 0.500 | -22.80 | 78.939 | 0.500 | -48.30 |
| 13.27 | 0.500 | 0.60 | 46.726 | 0.500 | -23.60 | 79.943 | 0.500 | -48.90 |
| 14.288 | 0.500 | 0.00 | 47.735 | 0.500 | -24.50 | 80.947 | 0.500 | -49.50 |
| 15.306 | 0.500 | -0.61 | 48.745 | 0.500 | -25.30 | 81.95 | 0.500 | -50.10 |
| 16.324 | 0.500 | -1.22 | 49.754 | 0.500 | -26.10 | 82.954 | 0.500 | -50.70 |
| 17.342 | 0.500 | -1.85 | 50.763 | 0.500 | -27.00 | 83.958 | 0.500 | -51.20 |
| 18.359 | 0.500 | -2.49 | 51.771 | 0.500 | -27.80 | 84.961 | 0.500 | -51.80 |
| 19.375 | 0.500 | -3.14 | 52.78 | 0.500 | -28.60 | 85.964 | 0.500 | -52.30 |
| 20.392 | 0.500 | -3.80 | 53.788 | 0.500 | -29.40 | 86.967 | 0.500 | -52.80 |
| 21.408 | 0.500 | -4.47 | 54.796 | 0.500 | -30.30 | 87.97 | 0.500 | -53.30 |
| 22.424 | 0.500 | -5.15 | 55.804 | 0.500 | -31.10 | 88.973 | 0.500 | -53.80 |
| 23.44 | 0.500 | -5.84 | 56.812 | 0.500 | -31.90 | 89.976 | 0.500 | -54.20 |
| 24.455 | 0.500 | -6.54 | 57.82 | 0.500 | -32.70 | 90.979 | 0.500 | -54.60 |
| 25.47 | 0.500 | -7.25 | 58.827 | 0.500 | -33.60 | 91.982 | 0.500 | -55.10 |
| 26.485 | 0.500 | -7.96 | 59.834 | 0.500 | -34.40 | 92.984 | 0.500 | -55.50 |
| 27.499 | 0.500 | -8.69 | 60.841 | 0.500 | -35.20 | 93.987 | 0.500 | -55.80 |
| 28.513 | 0.500 | -9.42 | 61.848 | 0.500 | -36.00 | 94.989 | 0.500 | -56.20 |
| 29.527 | 0.500 | -10.20 | 62.855 | 0.500 | -36.80 | 95.992 | 0.500 | -56.50 |
| 30.541 | 0.500 | -10.90 | 63.861 | 0.500 | -37.60 | 96.994 | 0.500 | -56.90 |
| 31.554 | 0.500 | -11.70 | 64.867 | 0.500 | -38.40 | 97.996 | 0.500 | -57.20 |
| 32.568 | 0.500 | -12.40 | 65.873 | 0.500 | -39.10 | 98.998 | 0.500 | -57.50 |
| | | | | | | 100 | 0.500 | -57.80 |

FIG. 6C

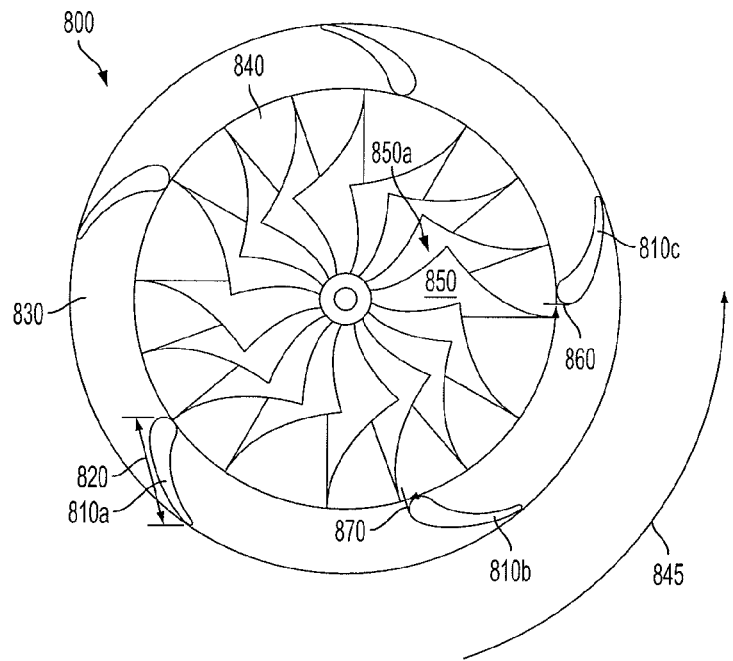
FIG. 8
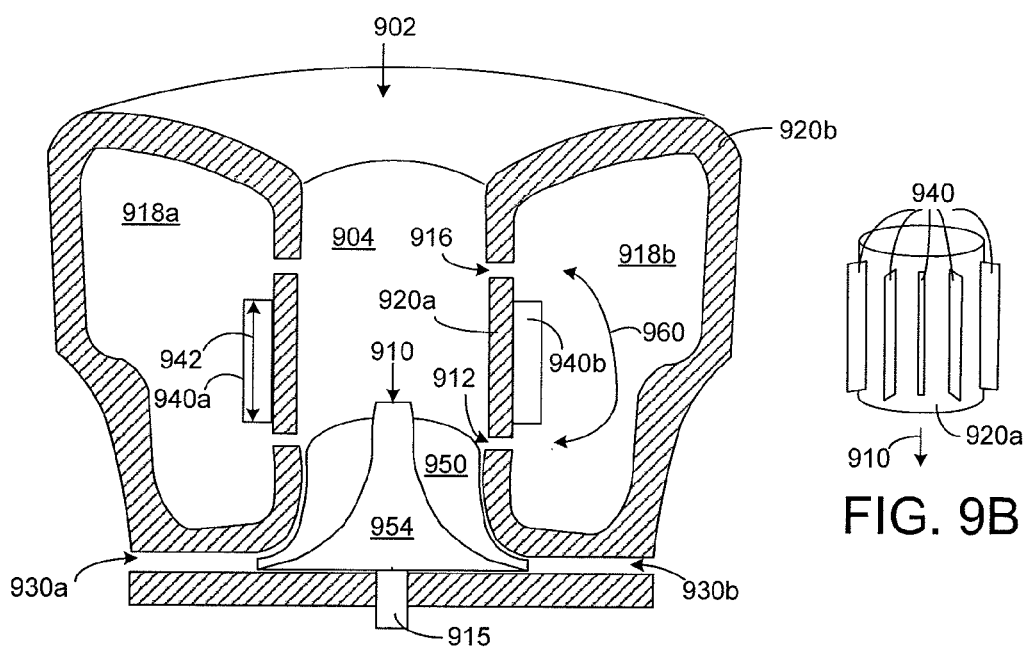
FIG. 9A
FIG. 9B

TURBOCHARGER

STATEMENT OF GOVERNMENT CONTRACT

This invention was made under U.S. Government contract No. DE-FC26-07NT43280, Department of Energy.

FIELD

The present application relates to systems for turbochargers of internal combustion engines with exhaust gas recirculation.

BACKGROUND AND SUMMARY

Engines may use a turbocharger to improve engine torque/power output density. In one example, a turbocharger may include a compressor and a turbine connected by a drive shaft, where the turbine is coupled to the exhaust manifold side and the compressor is coupled to the intake manifold side. In this way, the exhaust-driven turbine supplies energy to the compressor to increase the flow of air into the engine.

The compressor is intended to work in an operating range between two conditions, surge and choke. Surge occurs during low air mass flow, when the air flow through the compressor stalls and may reverse. The reversal of air flow may cause the engine to lose power. One source of surge, tip-out surge, may occur when the engine suddenly decelerates. During tip-out surge, the engine and the air flow mass through the compressor may slow down, while the turbocharger continues to spin due to inertia and delays through the exhaust system. The spinning compressor and low air flow rate may cause rapid pressure build-up on the compressor outlet, while the lagging higher exhaust flow rate may cause pressure reduction on the turbine side. When forward flow through the compressor can no longer be sustainable, a momentary flow reversal occurs, and the compressor is in surge.

A second source of surge may be caused in part by high levels of cooled exhaust gas recirculation (EGR). EGR may be used for reducing $NO_x$ emissions from diesel engines and for controlling knock in gasoline engines. High levels of EGR may increase compressor pressure while decreasing mass flow through the compressor causing the compressor to operate inefficiently or in the surge region.

Choke occurs when the air flow mass flowing through the compressor cannot be increased for a given speed of the compressor. During choke, the turbocharger cannot provide additional air to the engine, and so the engine power output density cannot be increased.

Therefore, it can be desirable to increase the operating range of the compressor and the turbocharger by reducing the air flow rate before surge occurs and increasing the air flow rate before choke occurs. One solution that has been used to widen the operating point is a passive casing treatment. The passive casing treatment includes a pair of immovable slots that modify the air flow through the compressor. During low air mass flow conditions, the slots of the passive casing treatment may provide a path to recirculate partially pressurized air back to the compressor inlet. The recirculated air flowing through the compressor may enable less air to flow through the compressor before surge occurs. During high air mass flow conditions, the slots of the passive casing treatment may provide a path to short-circuit air flow through the compressor so that the choke occurs at a higher air mass flow rate.

However, the inventors herein have recognized that an effective location for a passive recirculation slot to prevent surge is different from an effective location for a passive recirculation slot to prevent choke.

As such, an example of a turbocharger to address the above issues is described. The turbocharger includes an active casing treatment, an impeller, a casing, and a diffuser. The impeller includes a full blade having a leading edge, a splitter having a leading edge, and an axis of rotation. The casing includes a compressor inlet, an intake passage, a recirculation passage, a recirculation port, a bleed port, and an injection port. The intake passage contains the impeller in a gas flow path downstream from the compressor inlet and upstream from the diffuser. The leading edge of the full blade is upstream of the leading edge of the splitter. The bleed port is downstream of the leading edge of the full blade and upstream of the leading edge of the splitter. The injection port is downstream of the leading edge of the splitter. The recirculation port is downstream of the compressor inlet, upstream of the impeller, and configured to enable gas to flow between the recirculation passage and the intake passage. The active casing treatment is configured to selectively control gas flowing through the bleed port, between the intake passage and the recirculation passage, and selectively control gas flowing through the injection port, between the intake passage and the recirculation passage. In this way, a port may be optimized for both choke and surge conditions and the operating range of the turbocharger may be extended.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 4A-4F depict prophetic data for impeller blade characteristics that may extend the operating range of a turbocharger.

FIGS. 6A-6C depict prophetic data for turbine blade characteristics that may extend the operating range of a turbocharger.

FIG. 8 shows a partial view of an example impeller hub and diffuser.

FIGS. 9A-9B illustrate an example casing treatment for the turbocharger compressor.

DETAILED DESCRIPTION

Figure 1:
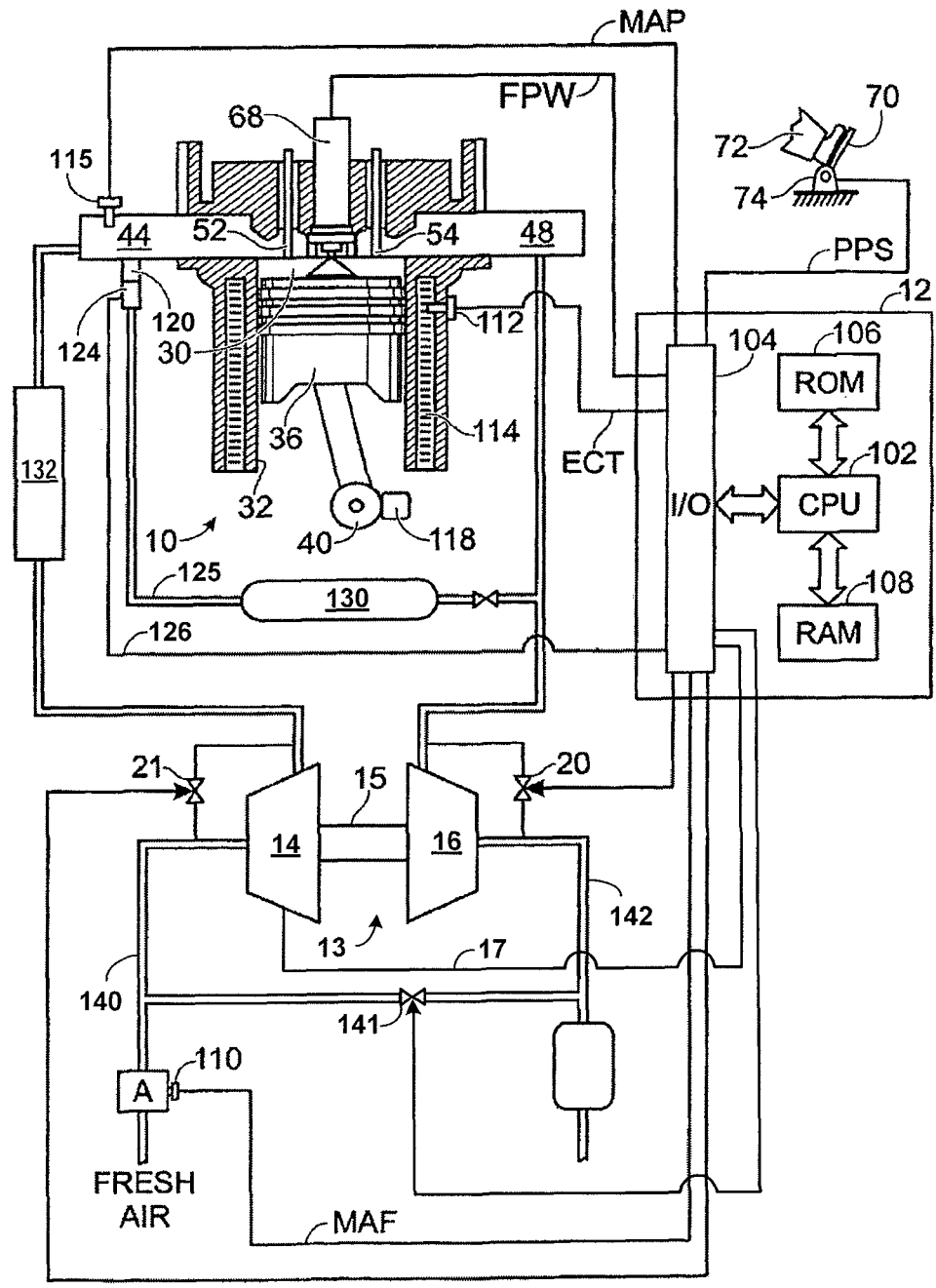
FIG. 1 shows a block diagram of a turbocharged engine with exhaust gas recirculation.
Figure 2A:
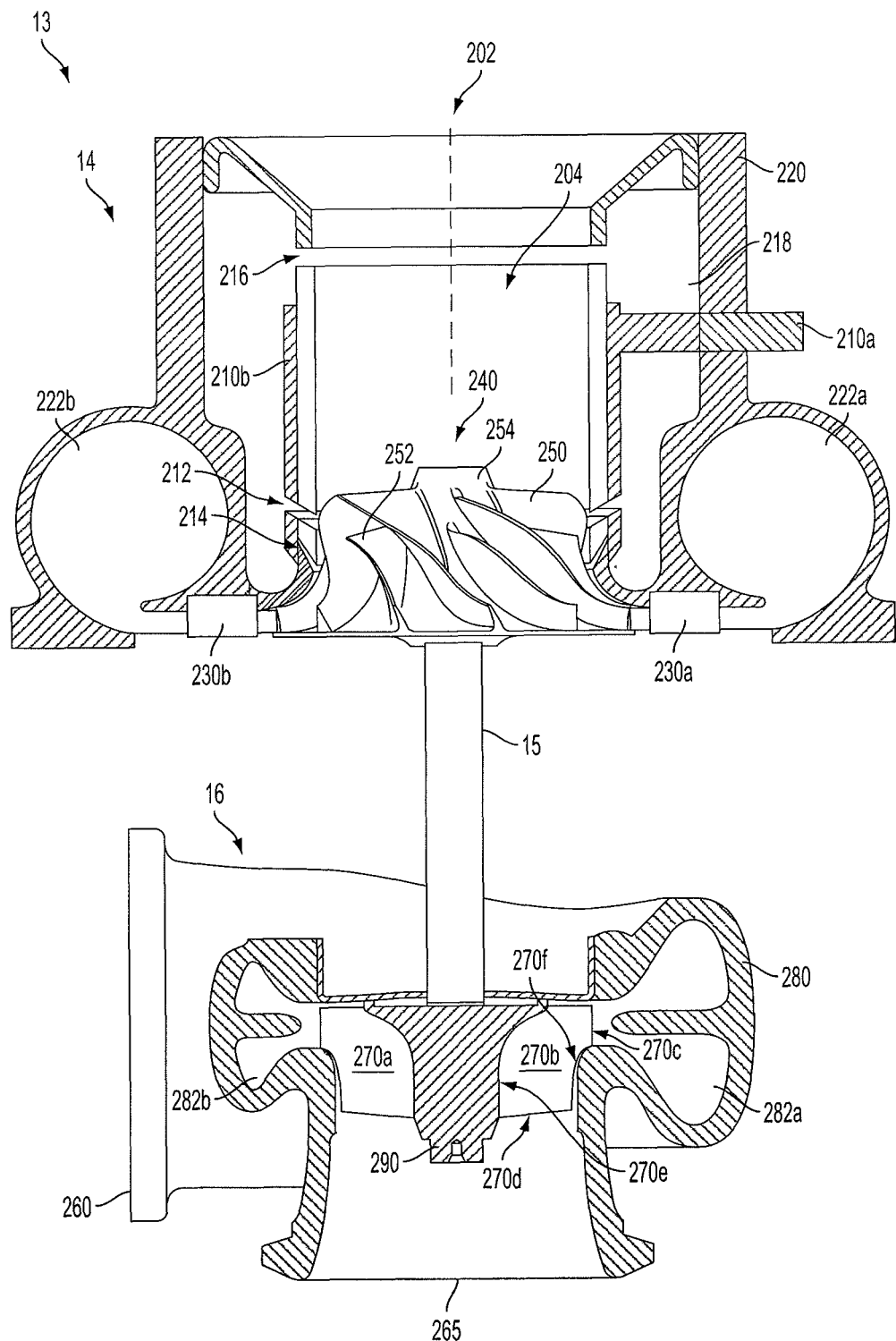
FIG. 2A shows a cut-away view of a turbocharger having a compressor and a turbine according to the present disclosure.

The following description relates to systems for turbochargers of internal combustion engines with exhaust gas recirculation (EGR). An example embodiment of an engine with a turbocharger and exhaust gas recirculation is illustrated in FIG. 1. The example turbocharger is shown in more detail in FIGS. 2A-2B, such that the components affecting aerodynamic flow through the turbocharger may be examined. In FIG. 2A, a compressor and a turbine in the turbocharger are illustrated. An example embodiment of an impeller blade of a compressor is shown in more detail in FIG. 2A. FIGS. 3A and 3B show a meridional projection of a blade and a cross-section of a blade, respectively, so that various blade characteristics may be defined. FIGS. 4A-4F are tables of prophetic data of impeller blade characteristics that may extend the operating range of the turbocharger. The data from FIGS. 4A-4F are graphed in FIGS. 5A-5B so that generalizations about the data may be observed. FIGS. 6A-6C are tables of prophetic data of turbine blade characteristics that may extend the operating range of the turbocharger. The data from FIGS. 6A-6C are graphed in FIGS. 7A-7B so that generalizations about the data may be observed. In FIG. 8, a partial view of an impeller hub and diffuser are illustrated from an example compressor. FIGS. 9A-9B show an example casing treatment for the turbocharger compressor. With this turbocharger configuration, it may be possible to extend the operating range of the turbocharger.

FIG. 1 shows an example of a turbocharged engine with an EGR system. Specifically, internal combustion engine 10, comprising a plurality of cylinders, one cylinder of which is shown in FIG. 1, is controlled by controller 12. Engine 10 includes combustion chamber 30 and cylinder walls 32 with piston 36 positioned therein and connected to crankshaft 40. Combustion chamber 30 communicates with intake manifold 44 and exhaust manifold 48 via respective intake valve 52 and exhaust valve 54. Intake manifold 44 is also shown having fuel injector 68 coupled thereto for delivering fuel in proportion to the pulse width of signal (FPW) from controller 12.

Controller 12 is shown as a microcomputer, including microprocessor unit 102, input/output ports 104, an electronic storage medium for executable programs and calibration values shown as read only memory chip 106 in this particular example, random access memory 108, and a conventional data bus.

Controller 12 receives various signals from sensors coupled to engine 10, including but not limited to: measurements of induced mass air flow (MAF) from mass air flow sensor 110 coupled to the air filter; engine coolant temperature (ECT) from temperature sensor 112 coupled to cooling sleeve 114; a measurement of manifold pressure (MAP) from manifold pressure sensor 115 coupled to intake manifold 44; and a profile ignition pick up signal (PIP) from Hall effect sensor 118 coupled to crankshaft 40 indicating an engine speed.

In a configuration known as high pressure EGR, exhaust gas is delivered to intake manifold 44 by EGR tube 125 communicating with exhaust manifold 48. EGR valve assembly 120 is located in EGR tube 125. Stated another way, exhaust gas travels from exhaust manifold 48 first through valve assembly 120, then to intake manifold 44. EGR valve assembly 120 can then be said to be located upstream of the intake manifold. There is also an optional EGR cooler 130 placed in EGR tube 125 to cool EGR before entering the intake manifold. Low pressure EGR may be used for recirculating exhaust gas from downstream of turbine 142 to upstream of compressor 140 via valve 141.

Pressure sensor 115 provides a measurement of manifold pressure (MAP) to controller 12. EGR valve assembly 120 has a valve position (not shown) for controlling a variable area restriction in EGR tube 125, which thereby controls EGR flow. EGR valve assembly 120 can either minimally restrict EGR flow through tube 125 or completely restrict EGR flow through tube 125, or operate to variably restrict EGR flow. Vacuum regulator 124 is coupled to EGR valve assembly 120. Vacuum regulator 124 receives actuation signal 126 from controller 12 for controlling valve position of EGR valve assembly 120. In one embodiment, EGR valve assembly is a vacuum actuated valve. However, any type of flow control valve may be used, such as, for example, an electrical solenoid powered valve or a stepper motor powered valve.

Turbocharger 13 has a turbine 16 coupled in the exhaust manifold 48 and a compressor 14 coupled in the intake manifold 44 via an intercooler 132. Turbine 16 is coupled to compressor 14 via drive shaft 15. Air at atmospheric pressure enters compressor 14 from passage 140. Exhaust from turbine 16 exits passage 142. Various turbocharger arrangements may be used. For example, a variable nozzle turbocharger (VNT) may be used when a variable area nozzle is placed upstream and/or downstream of the turbine in the exhaust line for varying the effective expansion of gasses through the turbine. Still other approaches may be used for varying expansion in the exhaust, such as a waste gate valve. FIG. 1 shows an example valve 20 acting as a waste gate. As noted above, the valve may be located within the turbine, or may be a variable nozzle.

FIG. 2A shows a cut-away view of an example embodiment of turbocharger 13. Turbine 16 converts the energy of the exhaust gas into rotational energy for rotating drive shaft 15 connected to impeller 240. Exhaust gas from exhaust manifold 48 enters turbine housing 280 through turbine inlet 260. The exhaust gas flows through volute passage 282 expanding through turbine outlet 265 and out exhaust passage 142. The flow of exhaust gas through turbine 16 generates a force on blade 270 coupled to hub 290 causing blade 270, hub 290, and drive shaft 15 to rotate. Two blades, 270a and 270b, are shown for turbine 16, but one skilled in the art will appreciate that more blades may be present in turbine 16. Turbine blade 270 includes inlet edge 270c, outlet edge 270d, hub edge 270e, and casing edge 270f.

Compressor 14 includes impeller 240, diffuser 230, compressor chamber 222, active casing treatment 210, and casing 220. The rotation of impeller 240, draws gas into compressor 14 through compressor inlet 202 of casing 220. As non-limiting examples, the gas may include air from passage 140, exhaust gas (such as when using long loop EGR), gaseous fuel (such as when using port injection of fuel), and combinations thereof. Gas flows from compressor inlet 202 and is accelerated by impeller 240 through diffuser 230 into compressor chamber 222. Diffuser 230 and compressor chamber 222 decelerate the gas causing an increase in pressure in compressor chamber 222. Gas under pressure may flow from compressor chamber 222 to intake manifold 44.

Elements in turbocharger 13 may be described relative to the direction of the gas flow path through turbocharger 13. An element substantially in the direction of gas flow relative to a reference point is downstream from the reference point. An element substantially opposite the direction of gas flow relative to a reference point is upstream from the reference point. For example, compressor inlet 202 is upstream from impeller 240 which is upstream from diffuser 230. Diffuser 230 is downstream from impeller 240 which is downstream from compressor inlet 202.

Impeller 240 includes hub 254, full blade 250, and splitter 252. Full blade 250 and splitter 252 are attached to hub 254. The edge of full blade 250 that is most upstream in compressor 14 is the leading edge of full blade 250. Similarly, splitter 252 includes a leading edge at the most upstream portion of splitter 252. The leading edge of full blade 250 is upstream of splitter 252. Impeller 240 includes an axis of rotation aligned with the axis of rotation for drive shaft 15 and turbine hub 290. The axis of rotation is substantially parallel with the flow of gas at the compressor inlet and substantially perpendicular to the flow of gas at the diffuser.

Casing 220 includes compressor inlet 202, intake passage 204, recirculation passage 218, recirculation port 216, bleed port 212, and injection port 214. Impeller 240 is contained in intake passage 204. Bleed port 212 is downstream of the leading edge of full blade 250 and upstream of the leading edge of splitter 252. Injection port 214 is downstream of the leading edge of splitter 252. Recirculation port 216 is downstream of compressor inlet 202 and upstream of impeller 240. Recirculation port 216 is configured to enable gas to flow between intake passage 204 and recirculation passage 218.

Active casing treatment 210 is configured to control gas flow through compressor 14. Specifically, active casing treatment 210, controlled by controller 12, may selectively control the flow of gas through bleed port 212 and injection port 214. During low mass flow conditions, active casing treatment 210 may enable gas to flow from intake passage 204 through bleed port 212 into recirculation passage 218. The gas further continues from recirculation passage 218 through recirculation port 216 into intake passage 204. Thus, the flow of gas striking the leading edge of full blade 250 may be greater than without bleed port 212. The additional flow of gas may enable the turbocharger compressor to operate with less flow of gas through the compressor before surge occurs.

During high mass flow conditions, active casing treatment 210 may enable gas to flow through injection port 214. During high mass flow conditions, a low pressure zone may be present in intake passage 204 downstream of the leading edge of splitter 252 adjacent to injection port 214. The low pressure zone may induce gas to flow from intake passage 204 through recirculation port 216 into recirculation passage 218 through injection port 214 back into intake passage 204. The short-circuit path through recirculation passage 218 may enable the flow of gas through the compressor to be increased at high mass flow conditions when compared to a compressor without injection port 214. In this way, the short-circuit flow of gas may enable more gas to flow before the turbocharger is in the choke operating condition.

Intake passage 204 may be substantially cylindrical. Recirculation passage 218 may be substantially annular since it is external to intake passage 204. The ports connecting intake passage 204 and recirculation passage 218, such as recirculation port 216, injection port 214, and bleed port 212 may each be implemented with various means. For example, the ports may be constructed as one or more holes formed in the casing. As another example, the ports may be constructed as one or more slots extending around the circumference of the intake passage. The ports may have a uniform or non-uniform width along the length of the port from intake passage 204 to recirculation passage 218. Each port may have a centerline extending along the length of the port from intake passage 204 to recirculation passage 218. The centerline may be normal to the axis of rotation of impeller 240, or the centerline may have a non-zero slope when compared to the normal to the axis of rotation of impeller 240.

Active casing treatment 210 may be implemented in many ways. For example, a slideable casing sleeve may be fitted in the recirculation passage to selectively block the flow of gas through injection port 214 and/or bleed port 212. The casing sleeve may include one or more holes and/or one or more slots that align with injection port 214 and/or bleed port 212 depending on the position of the casing sleeve. For example, when a controller, such as 12, detects low mass flow conditions, the casing sleeve may be adjusted so that slots in the casing sleeve align with bleed port 212 and slots in the casing sleeve do not align with injection port 214. In this way, the casing sleeve may be adjusted so that bleed port 212 is open and injection port 214 is blocked during low mass flow conditions.

As another example, when a controller detects high mass flow conditions, the casing sleeve may be adjusted so that slots in the casing sleeve align with injection port 214 but slots in the casing sleeve do not align with and bleed port 212. In this way, the casing sleeve may be adjusted so that injection port 214 is open and bleed port 212 is blocked during high mass flow conditions. In an alternative embodiment, active casing treatment 210 may be adjusted based on a pressure differential across compressor inlet 204 and intake manifold 44. In yet another alternative embodiment, active casing treatment 210 may be adjusted based on a pressure differential across intake manifold 44 and turbine inlet 260. It will be understood that these specific embodiments are presented for example, and are not intended to be limiting in any manner.

An active casing treatment may be used to extend the operating range of a turbocharger. However, the flow of gasses, and thus the operating range of a turbocharger, may not be independent of the geometry and the aerodynamic properties of other elements in the turbocharger, such as the impeller blades and the turbine blades. Therefore, combining an active casing treatment with aerodynamic compressor and turbine components may further extend the operating range of the turbocharger. A computational fluid dynamics (CFD) simulation may be used to simulate the effect of compressor blade and turbine blade geometries, bleed port and injection port locations and sizes, etc. to the flow of gasses through the turbocharger. A CFD simulation may also account for interdependencies between each of the elements in the turbocharger. By varying the geometry of elements in the turbocharger and simulating the effects on the flow of gasses, the operating range of the turbocharger may be extended. CFD simulation software is commercially available and may be purchased from ANSYS, Inc. of Canonsburg, Pa. or NUMECA International of Brussels, Belgium, for example.

Figure 2B:
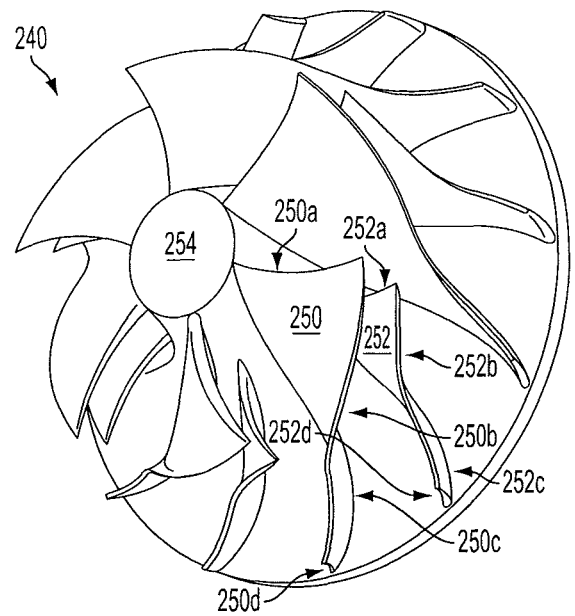
FIG. 2B shows an example compressor impeller including a hub and blades.
Figure 3A:
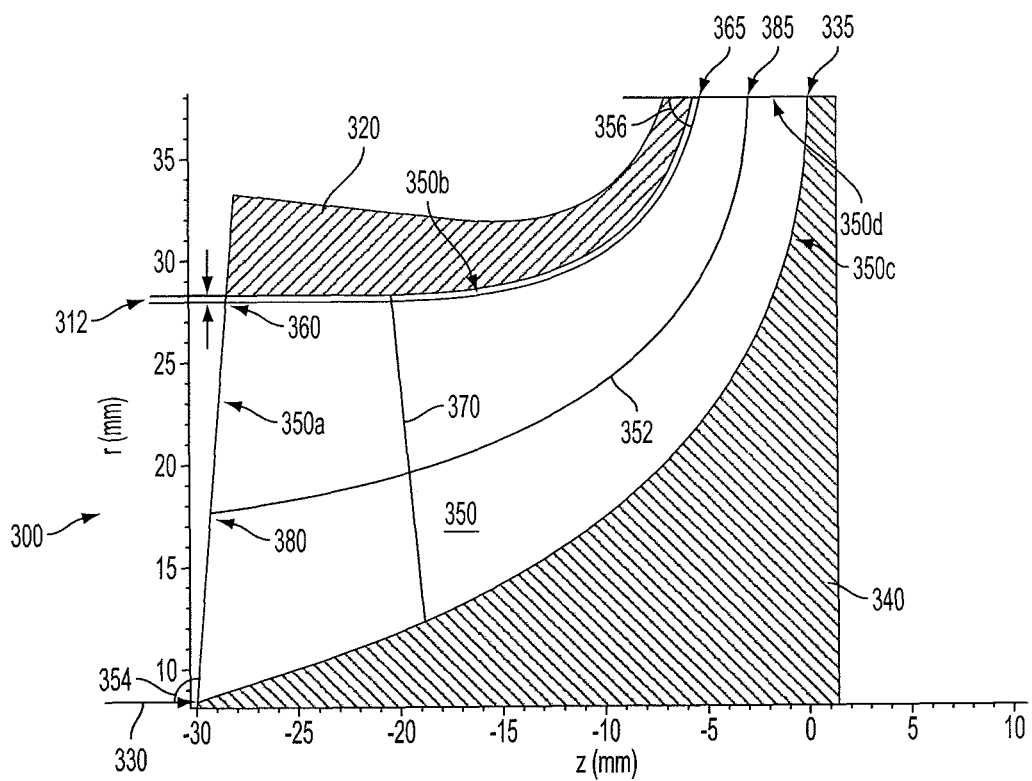
FIG. 3A shows a meridional projection of a hub, blade, and casing.
Figure 3B:
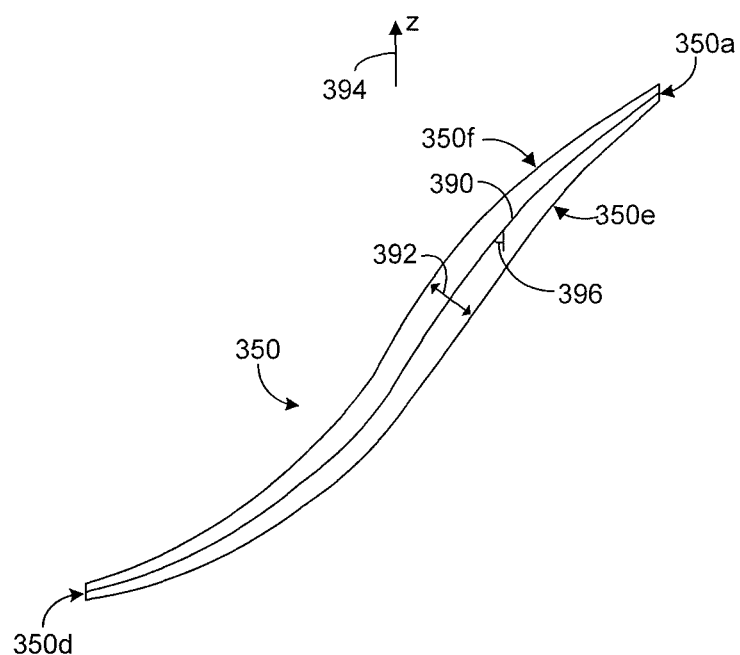
FIG. 3B shows a cross-sectional view of a blade.

Returning to the figures, FIG. 2B shows an example embodiment of compressor impeller 240 including hub 254, full blade 250, and splitter 252. Full blade 250 includes leading edge 250a, casing edge 250b, hub edge 250c, and outlet edge 250d. Splitter 252 includes leading edge 252a, casing edge 252b, hub edge 252c, and outlet edge 252d. As previously disclosed, the leading edge is the part of the blade that is most upstream in the gas flow through the impeller. The shape of the leading edge may be concave when facing the direction of impeller rotation. The casing edge is the edge of the blade that is closest to the casing. The hub edge is the boundary where the hub and the blade meet. The trailing edge is the edge of blade that is adjacent to the diffuser. A face of the blade is bounded by the leading, casing, hub, and outlet edges.

The geometric properties of the blade may be further examined by projecting the edges of the blade onto a flat plane. A projection that follows the edge of a surface is defined as a meridional projection. FIG. 3A shows a meridional projection of an example embodiment of blade 350 of impeller 300. Hub 340 and casing 320 are also illustrated. Hub 340 rotates about the z-axis. Blade 350 includes leading edge 350a, casing edge 350b, hub edge 350c, and outlet edge 350d. Leading edge 350a extends from 330 to 360. The distance along a projection may be measured in units such as mm, or it may be measured as a percentage distance along the meridional projection. Tracing hub edge 350c, leading edge intersection 330 is 0% meridional distance and outlet edge intersection 335 is 100% meridional distance. Tracing casing edge 350b, leading edge intersection 360 is 0% meridional distance and outlet edge intersection 365 is 100% meridional distance. A meridional contour may be drawn between two projections at like percentage meridional distances, such as meridional contour 370. Meridional contour 370 is approximately 30% along casing edge 350b and hub edge 350c. Leading edge 350a is another meridional contour at 0% between casing edge 350b and hub edge 350c. Bisection line 352 is the 50% span between casing edge 350b and hub edge 350c. In other words, bisection line 352 bisects all meridional contours from hub edge 350c to casing edge 350b. Tracing bisection line 352, leading edge intersection 380 is 0% meridional distance and outlet edge intersection 385 is 100% meridional distance.

Angle of inclination 354 is the angle from the z-axis to the leading edge of the blade. For the example embodiment of impeller 300, angle of inclination 354 may be between 91 and 95 degrees. Slope angle 356 is the angle between the z-axis and the tangent of the meridional projection of casing edge 350b at 100% meridional distance, where it meets outlet edge 350c. For the example embodiment of impeller 300, slope angle 356 may be between 73 and 74 degrees.

FIG. 3B illustrates a cross-sectional view of blade 350 traced along a constant meridional contour between hub edge 350c and casing edge 350b. A cross-section may be taken at hub edge 350c, bisection line 352, or casing edge 350b, for example. Pressure surface 350e forms one face of the blade and suction surface 350f forms a second face of the blade that is opposite pressure surface 350e. Mean line 390 lies halfway between pressure surface 350e and suction surface 350f. Thickness 392 is the thickness of blade 350. Mean line 390 may form an angle relative to axis of rotation 394, such as angle 396. Mean line 390 may be traced from 0% meridional distance at leading edge 350a to 100% meridional distance at outlet edge 350d, and the thickness of blade 350 and the angle of mean line 390 relative to the axis of rotation 394 may be determined. As mean line 390 is traced from 0% meridional distance to 100% meridional distance, the thickness of blade 350 and the angle of the mean line relative to the axis of rotation may vary with meridional distance which may affect the aerodynamic properties and the operating range of the turbocharger. Additionally, the mean line may be determined for different contours, such as at hub edge 350c, bisection line 352, and casing edge 350b, for example. The thickness of blade 350 and the angle of the mean line relative to the axis of rotation 394 at each mean line may also affect the aerodynamic properties and the operating range of the turbocharger. With properties of the blade defined, the properties of the blade may be modeled and simulated, such as with a computational fluid dynamics simulation, to produce a set of properties with good aerodynamic properties. FIGS. 4-7 illustrate properties of the impeller and turbine blades that may extend the operating range of the turbocharger, as in the example embodiment in FIG. 2.

FIGS. 4A-4F depict prophetic data for impeller 240 from FIG. 2. The thickness of the blade and the distribution of angles are measured at different areas of the blade so that a blade with good aerodynamic properties may be determined. Angles are measured from the z-axis to the mean line of the blade. FIG. 4A shows the thickness and the distribution of angles for full blade 250 along hub edge 250c. FIG. 4B shows the thickness and the distribution of angles for full blade 250 along the 50% span of full blade 250. FIG. 4C shows the thickness and the distribution of angles for full blade 250 along casing edge 250c. FIG. 4D shows the thickness and the distribution of angles for splitter 252 along hub edge 252c. FIG. 4E shows the thickness and the distribution of angles for splitter 252 along the 50% span of splitter 252. FIG. 4F shows the thickness and the distribution of angles for splitter 252 along casing edge 252c.

Figure 5A:
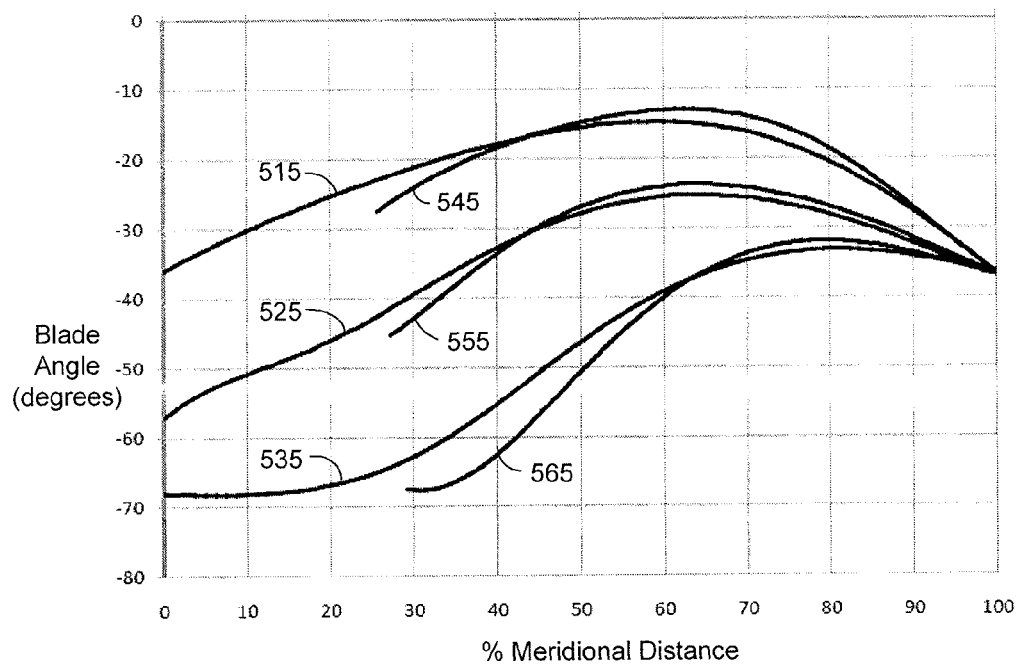
FIG. 5A depicts impeller blade angle according to the present disclosure.
Figure 5B:
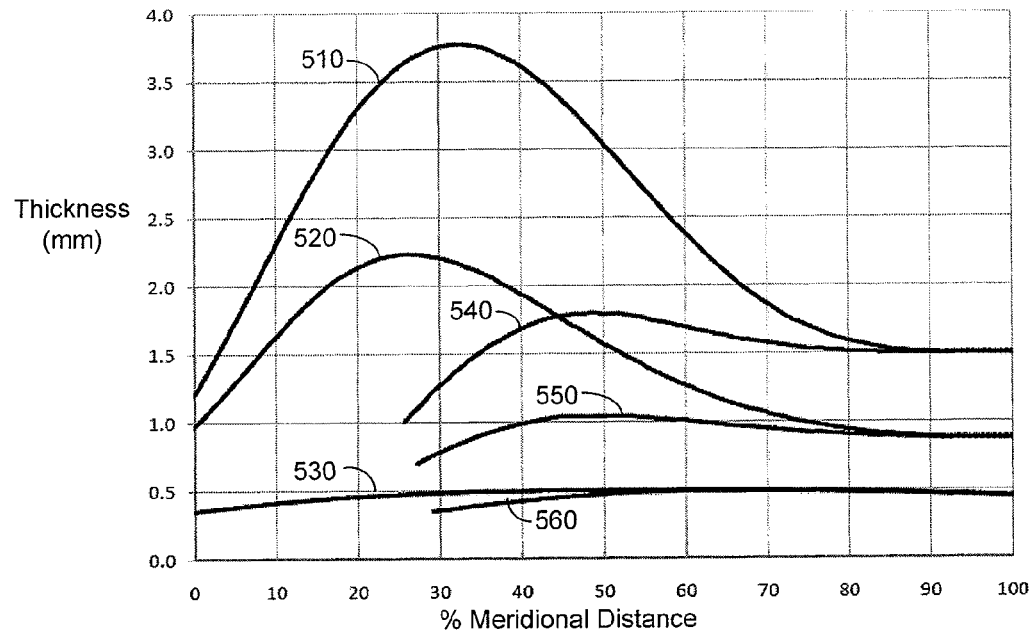
FIG. 5B depicts impeller blade thickness according to the present disclosure.

The prophetic data from FIGS. 4A-4F are graphed in FIGS. 5A-5B. FIG. 5A illustrates the distribution of angles for the compressor blades. The distribution of angles for full blade 250 is shown in curves 515, 525, and 535.

The distribution of angles along hub edge 250c is shown in FIG. 4A and in curve 515 of FIG. 5A. The magnitude of the angle at the corner intersecting with leading edge 250a (0% meridional distance) is 36 degrees, decreasing to the minimum magnitude of 14-15 degrees at the 55-65% meridional distance, increasing to a magnitude of 36-37 degrees at the corner intersecting with outlet edge 250d (100% meridional distance).

The distribution of angles along the 50% span of blade 250 is shown in FIG. 4B and in curve 525 of FIG. 5A. The 50% span of blade 250 bisects the meridional contours from hub edge 250c to casing edge 250b. The magnitude of the angle at leading edge 250a (0% meridional distance) is about 57 degrees, decreasing to the minimum magnitude of 25-26 degrees at the 60-65% meridional distance, increasing to a magnitude of 36-37 degrees at the intersection with outlet edge 250d (100% meridional distance).

The distribution of angles along casing edge 250c is shown in FIG. 4C and in curve 535 of FIG. 5B. The magnitude of the angle at the corner intersecting with leading edge 250a (0% meridional distance) is 66-70 degrees. The 66-70 degree angle is kept substantially constant until the 10-15% meridional distance where the magnitude of the angle starts to decrease to the minimum angle of 33-34 degrees at the 78-82% meridional distance. From the minimum, the magnitude of the angle increases to 36-37 degrees at the corner intersecting with outlet edge 250d (100% meridional distance).

The prophetic data may yield some generalizations about the distributions of angles along the mean line of the full blade. The mean line of an aerodynamic full blade may have a first distribution of angles where each angle is measured between the axis of rotation and the mean line at the hub edge at a meridional distance along the hub edge. The first distribution of angles may include a first angle at 0% meridional distance, a second angle at between the 50% to 70% meridional distance, and a third angle at 100% meridional distance. The first angle may be between 30 and 40 degrees. The second angle may be a minimum of the distribution of angles, the second angle being between 30% and 50% of the first angle. The third angle may be within 10% of the first angle.

The mean line of an aerodynamic full blade may further include a second distribution of angles, each angle measured between the axis of rotation and the mean line at the casing edge at a meridional distance along the casing edge. The second distribution of angles may include a substantially constant first angle at 0% meridional distance to between 10% and 20% meridional distance, a second angle at between the 70% to 90% meridional distance, and a third angle at 100% meridional distance. The first angle may be between 65 and 75 degrees. The second angle may be a minimum of the second distribution of angles, the second angle being between 40% and 60% of the first angle. The third angle may be between 40% and 60% of the first angle.

The mean line of an aerodynamic full blade may further include a third distribution of angles, each angle measured between the axis of rotation and the mean line at the bisection line at a meridional distance along the bisection line. The third distribution of angles may include a first angle at 0% meridional distance, a second angle at between the 50% to 70% meridional distance, and a third angle at 100% meridional distance. The first angle may be between 50 and 65 degrees. The second angle may be a minimum of the third distribution of angles, the second angle being between 30% and 45% of the first angle. The third angle may be between 50% and 75% of the first angle.

The distributions of angles of splitter 252 are shown in curves 545, 555, and 565. The initial angle of the splitter for each angle distribution starts at a non-zero meridional distance because the z-dimension value of the splitter is projected onto the meridional distance of the full blade so that the splitter and full blade angle distributions may be more easily compared. Hence, angle distributions for splitter 252 start between 25-30% meridional distance.

The distribution of angles along hub edge 252*c* is shown in FIG. 4D and in curve 545 of FIG. 5A. The magnitude of the angle at the corner intersecting with leading edge 252*a* is 27-28 degrees at 25-26% meridional distance, decreasing to the minimum magnitude of 13-14 degrees at the 60-65% meridional distance, increasing to a magnitude of 36-37 degrees at the corner intersecting with outlet edge 252*d*.

The distribution of angles along the 50% span of splitter 252 is shown in FIG. 4E and in curve 555 of FIG. 5A. The 50% span of splitter 252 bisects the meridional contours from hub edge 252*c* to casing edge 252*b*. The magnitude of the angle intersecting with leading edge 252*a* is 45-46 degrees at 27% meridional distance, decreasing to the minimum magnitude of 23-24 degrees at the 60-65% meridional distance, increasing to a magnitude of 36-37 degrees at the corner intersecting with outlet edge 252*d*.

The distribution of angles along casing edge 252*b* is shown in FIG. 4F and in curve 565 of FIG. 5A. The magnitude of the angle at the corner intersecting with leading edge 252*a* is 67-68 degrees at the 29% meridional distance, decreasing to the minimum magnitude of 31-32 degrees at the 75-80% meridional distance, increasing to a magnitude of 36-37 degrees at the corner intersecting with outlet edge 252*d*.

The prophetic data may yield some generalizations about the distributions of angles along the mean line of the splitter. The mean line of an aerodynamic splitter may have a first distribution of angles, each angle measured between the axis of rotation and the mean line at the hub edge at a meridional distance along the hub edge, the hub edge intersecting the leading edge at between 20% and 30% meridional distance and intersecting the outlet edge at 100% meridional distance. The first distribution of angles may include a first angle at where the hub edge intersects the leading edge, a second angle at between 55% to 70% meridional distance, and a third angle at 100% meridional distance. The first angle may be between 20 and 30 degrees. The second angle may be a minimum of the first distribution of angles, the second angle between 30% and 50% of the first angle. The third angle may be between 100% and 160% the first angle.

The mean line of an aerodynamic splitter may further include a second distribution of angles, each angle measured between the axis of rotation and the mean line at the casing edge at a meridional distance along the casing edge, the casing edge intersecting the leading edge at between 25% and 30% meridional distance and intersecting the outlet edge at 100% meridional distance. The second distribution of angles may include a first angle at where the casing edge intersects the leading edge, a second angle at between 70% to 90% meridional distance, and a third angle at 100% meridional distance. The first angle may be between 65 and 75 degrees. The second angle may be a minimum of the second distribution of angles, the second angle being between 40% and 60% of the first angle. The third angle may be between 40% and 60% of the first angle.

The mean line of an aerodynamic splitter may further include a third distribution of angles, each angle measured between the axis of rotation and the mean line at the bisection line at a meridional distance along the bisection line, the bisection line intersecting the leading edge at between 25% and 35% meridional distance and intersecting the outlet edge at 100% meridional distance. The third distribution of angles may include a first angle at where the bisection line intersects the leading edge, a second angle at between 55% to 70% meridional distance, and a third angle at 100% meridional distance. The first angle may be between 40 and 50 degrees. The second angle may be a minimum of the third distribution of angles, the second angle being between 55% and 70% of the first angle. The third angle may be between 60% and 100% of the first angle.

In addition to the distribution of angles along each mean line of the blades, the thickness of each blade may affect the aerodynamic properties of the turbocharger. FIG. 5B depicts prophetic data of the distribution of impeller blade thickness according to the present disclosure. The distribution of thicknesses for full blade 250 is shown in curves 510, 520, and 530.

The distribution of thicknesses for full blade 250 along hub edge 250*c* is shown in FIG. 4A and in curve 510 of FIG. 5B. The initial thickness at 0% meridional distance increases to a maximum thickness greater than 190% thicker than the initial thickness at between 30% and 35% meridional distance. The ending thickness is 50% thicker than the initial thickness. The ending thickness is substantially constant from 90% meridional distance to 100% meridional distance.

The distribution of thicknesses for full blade 250 along the bisection line (50% span) is shown in FIG. 4B and in curve 520 of FIG. 5B. The initial thickness at 0% meridional distance increases to a maximum thickness greater than 130% thicker than the initial thickness at between 25% and 30% meridional distance. The ending thickness is within 5% of the initial thickness from 90% meridional distance to 100% meridional distance.

The distribution of thicknesses for full blade 250 along casing edge 250*b* is shown in FIG. 4C and in curve 530 of FIG. 5B. The initial thickness at 0% meridional distance increases to a maximum thickness greater than 40% thicker than the initial thickness at 50% meridional distance. The ending thickness is 50% thicker than the initial thickness and the ending thickness is substantially constant from 90% meridional distance to 100% meridional distance. The distribution of thicknesses for splitter 252 is shown in curves 540, 550, and 560. The initial thickness in each of the thickness distributions starts at a non-zero meridional distance because the z-dimension value of the splitter is projected onto the meridional distance of the full blade so that the splitter and full blade thickness distributions can be more easily compared.

The distribution of thicknesses for splitter 252 along hub edge 252*c* is shown in FIG. 4D and in curve 540 of FIG. 5B. The initial thickness at 25-26% meridional distance increases to a maximum thickness greater than 75% thicker than the initial thickness at between 40% and 45% meridional distance. The ending thickness is 50% thicker than the initial thickness and is substantially constant from 80% meridional distance to 100% meridional distance.

The distribution of thicknesses for splitter 252 along the bisection line (50% span) is shown in FIG. 4E and in curve 550 of FIG. 5B. The initial thickness at 27% meridional distance increases to a maximum thickness greater than 40% thicker than the initial thickness at between 45% and 50% meridional distance. The ending thickness is greater than 10% thicker than the initial thickness at 100% meridional distance.

The distribution of thicknesses for splitter 252 along casing edge 252b is shown in FIG. 4F and in curve 560 of FIG. 5B. The initial thickness at 29% meridional distance increases to a maximum thickness greater than 40-45% thicker than the initial thickness at 60-70% meridional distance. The ending thickness is 25-30% thicker than the initial thickness from 90% meridional distance to 100% meridional distance; the aerodynamic properties of turbine 16 may also be specified so that the operating range of the turbocharger may be extended. Specifically, the distribution of turbine blade angles and the thickness of the turbine blade may be specified. FIGS. 6A-6C depict prophetic data for turbine blade characteristics with good aerodynamic properties. FIG. 6A shows the thickness and the distribution of angles for blade 270 along hub edge 270e. FIG. 6B shows the thickness and the distribution of angles for blade 270 along the 50% span of blade 270. FIG. 6C shows the thickness and the distribution of angles for blade 270 along casing edge 270f.

Figure 7A:
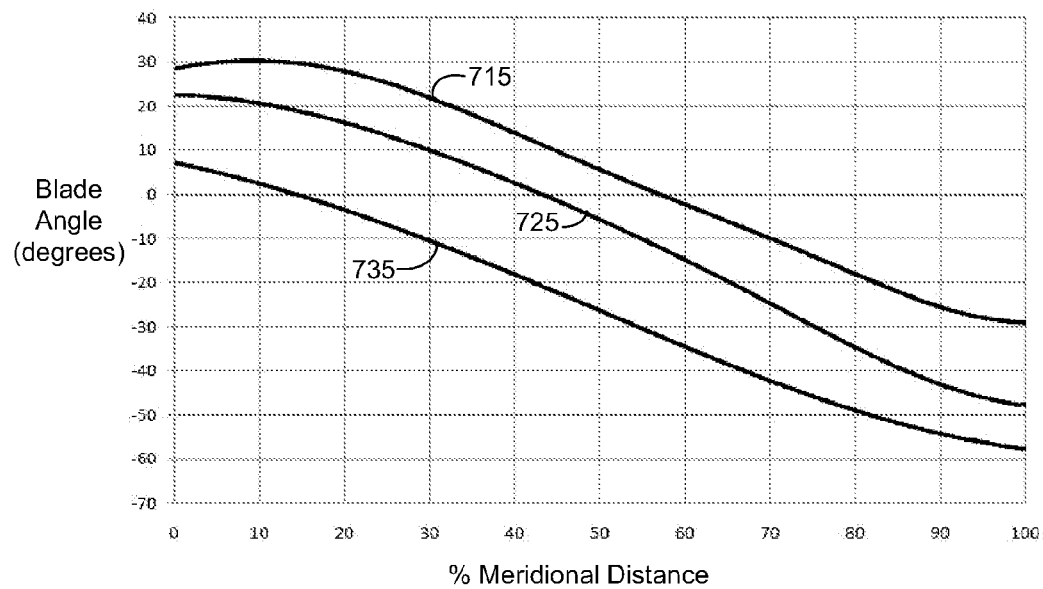
FIG. 7A depicts turbine blade angle according to the present disclosure.

FIG. 7A depicts the distribution of blade angles for an example embodiment of turbine 16. The turbine blade, such as blade 270 in FIG. 2, includes an inlet edge, an outlet edge, a hub edge, a casing edge, a pressure surface, and a suction surface. The pressure surface is opposite the suction surface and a mean line lies midway between the pressure surface and the suction surface. Each of the pressure and suction surfaces is bounded by the hub, inlet, casing, and outlet edges. The turbine blade angle is measured from the z-axis to the mean line of the blade. The distribution of angles for blade 270 is shown in curves 715, 725, and 735.

The distribution of angles along hub edge 270e is shown in FIG. 6A and in curve 715 of FIG. 7A. The distribution of angles includes a beginning angle of between 25 and 35 degrees at the intersection of the inlet edge and the hub edge (0% meridional distance). The distribution of angles also includes an ending angle between −30 and −25 degrees at the intersection of the outlet edge and the hub edge (100% meridional distance).

The distribution of angles the 50% span of turbine blade 270 is shown in FIG. 6B and in curve 725 of FIG. 7A. The distribution of angles includes a beginning angle of between 20 and 25 degrees where the 50% span intersects the inlet edge (0% meridional distance). The distribution of angles also includes an ending angle between −40 and −50 degrees where the 50% span intersects the outlet edge (100% meridional distance).

The distribution of angles along casing edge 270f is shown in FIG. 6C and in curve 735 of FIG. 7A. The distribution of angles includes a beginning angle of between 5 and 10 degrees at the intersection of the inlet edge and the casing edge (0% meridional distance). The distribution of angles also includes an ending angle between −50 and −60 degrees at the intersection of the outlet edge and the casing edge (100% meridional distance).

Figure 7B:
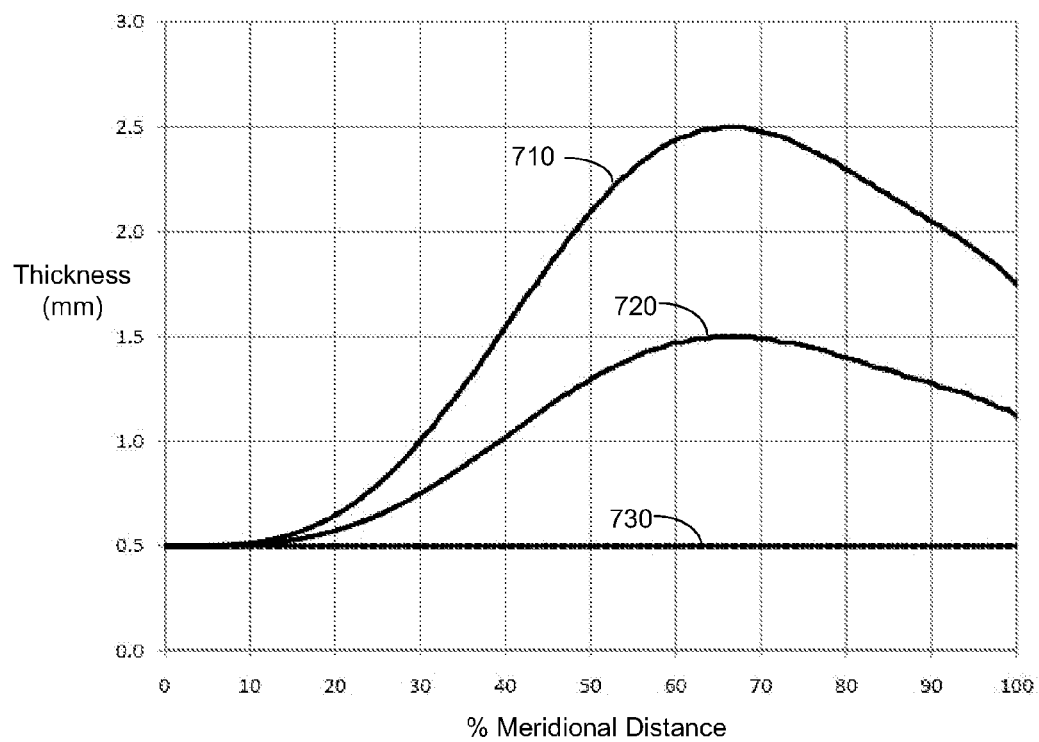
FIG. 7B depicts the turbine blade thickness according to the present disclosure.

FIG. 7B depicts the turbine blade thickness for an example embodiment of turbine 16. The distribution of thicknesses for blade 270 is shown in curves 710, 720, and 730. FIG. 6A and curve 710 of FIG. 7B show a distribution of thicknesses along a meridional projection of hub edge 270e where the hub edge intersects the inlet edge at 0% meridional distance and intersects the outlet edge at 100% meridional distance. The distribution of thicknesses includes an initial thickness that is substantially constant from between 0% meridional distance to 10% meridional distance. The maximum thickness occurs between 60% and 70% meridional distance and the maximum thickness is greater than 400% thicker than the initial thickness. The ending thickness is greater than 300% thicker than the initial thickness at 100% meridional distance.

FIG. 6B and curve 720 of FIG. 7B show a distribution of thicknesses along the 50% span of turbine blade 270. The distribution of thicknesses includes an initial thickness that is substantially constant from between 0% meridional distance to 10% meridional distance. The maximum thickness occurs between 60% and 70% meridional distance and the maximum thickness is greater than 200% thicker than the initial thickness. The ending thickness is greater than 100% thicker than the initial thickness at 100% meridional distance.

FIG. 6C and curve 730 of FIG. 7B show a distribution of thicknesses along a meridional projection of casing edge 270f. The thickness along the meridional projection of casing edge 270f is substantially constant. In an example embodiment, the thickness of turbine blade 270 at 0% meridional distance at hub edge 270e is within 0.2 mm of the thickness of the blade at casing edge 270f.

Other components within the turbocharger may also have an impact on the aerodynamic properties of the turbocharger and hence, affect the operating range. FIG. 8 shows a top view of an example embodiment of an impeller and a diffuser. The impeller includes blade 850 and hub 840. Diffuser passage 830 forms an annular passage at the outlet of the impeller. Diffuser passage 830 may contain a plurality of diffuser vanes 810. The impeller rotates within the casing (not shown) in the direction of 845, accelerating gas from leading edge 850a to the outlet of the impeller at the inner circumference of diffuser passage 830. Diffuser vanes 810 may help to decelerate the gas so that the pressure in the compressor chamber (not shown) is increased over the pressure in the impeller.

The aerodynamic design of the vaned diffuser may strike a balance between decelerating gas and limiting flow through the impeller. Solidity is a property of the diffuser that may determine the aerodynamic flow through the diffuser. Solidity is defined as the ratio of diffuser vane camber length 820 to the arc between adjacent diffuser vanes. The length of the arc may be measured between 860 and 870, for example. A large solidity value may increase the efficiency of the compressor, but it may compromise the gas flow through the compressor. A solidity of less than 0.8 may enable an increased operating range for the turbocharger by allowing more gas to flow through the compressor before choking than would be possible with solidity greater than or equal to 0.8. Combining a diffuser with solidity less than 0.8 with aerodynamic compressor blades, aerodynamic turbine blades, and/or an active casing treatment may enable an even wider operating range for the turbocharger.

Another element that may be employed for improving the aerodynamics of the compressor is shown in FIGS. 9A-9B. FIG. 9A illustrates a partial cross-sectional view of an example embodiment of a turbocharger compressor having a casing treatment. The compressor includes a casing, an impeller, and a diffuser. The impeller includes hub 954 and blade 950. The impeller rotates about axis of rotation 910 when rotated by drive shaft 915. Casing 920 includes compressor inlet 902, intake passage 904, recirculation passage 918, upstream port 916, downstream port 912, and vane 940. Intake passage 904 contains the impeller in a gas flow path downstream from compressor inlet 902 and upstream from diffuser passages 930a and 930b. Upstream port 916 and downstream port 912 enable gas to flow between recirculation passage 918 and intake passage 904 as indicated by 960. Vane 940 in recirculation passage 918 may improve the aerodynamic flow of gas through recirculation passage 918 which may extend the operating range of the turbocharger. Vane 940 in recirculation passage 918 may be referred to as a casing treatment.

There are two vanes shown in FIG. 9A, vane 940a in recirculation passage 918a and vane 940b in recirculation passage 918b. However, one or more vanes may be included in the recirculation passage. Camber line 942 extends the length of vane 940. In FIG. 9A, camber line 942 is oriented substantially parallel to axis of rotation 910.

FIG. 9B illustrates an alternate view of part of casing 920 and vane 940. Casing section 920a is annular, with the inner circumference forming part of the intake passage and the outer circumference forming part of the recirculation passage wall. The top surface of casing section 920a may form the lower wall of upstream port 916. The bottom surface of casing section 920a may form the upper wall of downstream port 912. Vane 940 may be coupled to casing section 920a as shown in the example embodiment. In an alternate embodiment, vane 940 may be coupled to a different wall in recirculation passage 918. In another alternate embodiment, vane 940 may be coupled to multiple walls within recirculation passage 918. For example, vane 940 may be coupled to casing section 920a and 920b, extending across upstream port 916 and/or downstream port 912. In this way, vane 940 may couple sections of casing 920 to each other.

In FIGS. 9A and 9B, camber line 942 is oriented substantially parallel to axis of rotation 910. In alternate embodiments, camber line 942 may be oriented non-parallel to axis of rotation 910. For example, the angle between axis of rotation 910 and camber line 942 may be biased in the direction of rotation. In alternate embodiments, the shape of camber line 942 may not be straight. As non-limiting examples, the shape of camber line 942 may be straight, rectilinear, or curvilinear. In the example embodiment, vane 940 is a uniform thickness. As non-limiting examples, vane 940 may be of uniform thickness, tapered on one end, tapered on both ends, etc. In an alternative embodiment, a first vane may have a first shape and first orientation, a second vane may have a second shape and a second orientation, etc.

The casing treatment in FIGS. 9A and 9B may be combined with one or more of a diffuser with solidity less than 0.8, aerodynamic compressor blades, aerodynamic turbine blades, and an active casing treatment to potentially increase the operating range for the turbocharger. As a non-limiting example, adding a vane like vane 940 to active casing treatment 210 may improve the aerodynamic flow through the recirculation passage. The vane may be coupled to the casing sleeve, the vane may be coupled to a wall in the recirculation passage, or a first vane may be coupled to casing sleeve and a second vane may be coupled to the recirculation passage wall, for example.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, gasoline, diesel and other engine types and fuel types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

Such claims, whether broader, narrower, equal, or different in scope to the original claims, also are regarded as included within the subject matter of the present disclosure.

The invention claimed is:

1. A turbocharger for an internal combustion engine, the turbocharger having a compressor, the compressor comprising:
   a diffuser;
   an impeller including a hub that rotates about an axis of rotation, a full blade having a leading edge and coupled to the hub along a hub edge, and a splitter having a leading edge and coupled to the hub; and
   a casing including a compressor inlet, an intake passage, a recirculation passage, a recirculation port, a bleed port, and an injection port, the intake passage containing the impeller in a gas flow path downstream from the compressor inlet and upstream from the diffuser, the leading edge of the full blade being upstream of the leading edge of the splitter, the bleed port being downstream of the leading edge of the full blade and upstream of the leading edge of the splitter, the injection port being downstream of the leading edge of the splitter, and the recirculation port being downstream of the compressor inlet, upstream of the impeller, and configured to enable gas to flow between the recirculation passage and the intake passage;
   the full blade including a casing edge adjacent to the casing, an outlet edge adjacent to the diffuser, a bisection line between the casing edge and the outlet edge, and a first distribution of angles, each angle measured between the axis of rotation and a mean line at the hub edge at a meridional distance along the hub edge, the hub edge intersecting the leading edge at 0% meridional distance and intersecting the outlet edge at 100% meridional distance, the first distribution of angles including a first angle at 0% meridional distance, a second angle at between 50% to 70% meridional distance, and a third angle at 100% meridional distance, the first angle being between 30 and 40 degrees, the second angle being a minimum of the first distribution of angles, the second angle being between 30% and 50% of the first angle, the third angle being within 10% of the first angle.

2. The turbocharger of claim 1 wherein the full blade further includes a second distribution of angles, each angle measured between the axis of rotation and a mean line at the casing edge at a meridional distance along the casing edge, the casing edge intersecting the leading edge at 0% meridional distance and intersecting the outlet edge at 100% meridional distance, the second distribution of angles including a substantially constant first angle at 0% meridional distance to between 10% and 20% meridional distance, a second angle at between 70% to 90% meridional distance, and a third angle at 100% meridional distance, the first angle between 65 and 75 degrees, the second angle being a minimum of the second distribution of angles, the second angle being between 40% and 60% of the first angle, the third angle being between 40% and 60% of the first angle.

3. The turbocharger of claim 1 wherein the full blade further includes a third distribution of angles, each angle measured between the axis of rotation and a mean line at the bisection line at a meridional distance along the bisection line, the bisection line intersecting the leading edge at 0% meridional distance and intersecting the outlet edge at 100% meridional distance, the third distribution of angles including a first angle at 0% meridional distance, a second angle at between 50% to 70% meridional distance, and a third angle at 100% meridional distance, the first angle between 50 and 65 degrees, the second angle being a minimum of the third distribution of angles, the second angle being between 30% and 45% of the first angle, the third angle being between 50% and 75% of the first angle.

4. The turbocharger of claim 1 wherein the leading edge of the full blade defines a first meridional projection, and an angle of inclination between the axis of rotation and the first meridional projection is between 91 and 95 degrees; and the casing edge of the full blade defining a second meridional projection having a tangent line at 100% meridional distance, a slope angle measured from the second meridional projection at 100% meridional distance to the axis of rotation being between 73 and 74 degrees.

5. The turbocharger of claim 1 wherein the full blade includes a first distribution of thicknesses following a meridional projection along the hub edge, the first distribution of thicknesses including a first thickness at 0% meridional distance, a maximum thickness greater than 190% thicker than the first thickness at between 30% and 35% meridional distance, and an ending thickness 50% thicker than the first thickness from 90% meridional distance to 100% meridional distance;

the full blade including a second distribution of thicknesses following a meridional path along the casing edge, the second distribution of thicknesses including a first thickness at 0% meridional distance, a maximum thickness greater than 40% thicker than the first thickness at 50% meridional distance, and an ending thickness 50% thicker than the first thickness from 90% meridional distance to 100% meridional distance;

the full blade including a third distribution of thicknesses following a meridional path along the bisection line, the third distribution of thicknesses including a first thickness at 0% meridional distance, a maximum thickness greater than 130% thicker than the first thickness at between 25% and 30% meridional distance, and an ending thickness within 5% of the first thickness from 90% meridional distance to 100% meridional distance.

6. The turbocharger of claim 1 wherein the splitter comprises a hub edge where the splitter is coupled to the hub, a casing edge adjacent to the casing, an outlet edge adjacent to the diffuser, a bisection line between the hub edge and the casing edge, and a first distribution of angles, each angle measured between the axis of rotation and a mean line at the hub edge at a meridional distance along the hub edge, the hub edge intersecting the leading edge at between 20% and 30% meridional distance and intersecting the outlet edge at 100% meridional distance, the first distribution of angles including a first angle at where the hub edge intersects the leading edge, a second angle at between 55% to 70% meridional distance, and a third angle at 100% meridional distance, the first angle between 20 and 30 degrees, the second angle being a minimum of the first distribution of angles, the second angle between 30% and 50% of the first angle, the third angle between 100% and 160% the first angle;

the splitter including a second distribution of angles, each angle measured between the axis of rotation and a mean line at the casing edge at a meridional distance along the casing edge, the casing edge intersecting the leading edge at between 25% and 30% meridional distance and intersecting the outlet edge at 100% meridional distance, the second distribution of angles including a first angle at where the casing edge intersects the leading edge, a second angle at between 70% to 90% meridional distance, and a third angle at 100% meridional distance, the first angle being between 65 and 75 degrees, the second angle being a minimum of the second distribution of angles, the second angle being between 40% and 60% of the first angle, the third angle being between 40% and 60% of the first angle; and the splitter including a third distribution of angles, each angle measured between the axis of rotation and a mean line at the bisection line at a meridional distance along the bisection line, the bisection line intersecting the leading edge at between 25% and 35% meridional distance and intersecting the outlet edge at 100% meridional distance, the third distribution of angles including a first angle at where the bisection line intersects the leading edge, a second angle at between 55% to 70% meridional distance, and a third angle at 100% meridional distance, the first angle being between 40 and 50 degrees, the second angle being a minimum of the third distribution of angles, the second angle being between 55% and 70% of the first angle, the third angle being between 60% and 100% of the first angle.

7. The turbocharger of claim 6 wherein the splitter includes a first distribution of thicknesses following a meridional projection along the hub edge, the first distribution of thicknesses including a first thickness at between 25% and 26% meridional distance, a maximum thickness greater than 75% thicker than the first thickness at between 40% and 45% meridional distance, and an ending thickness 50% thicker than the first thickness from 80% meridional distance to 100% meridional distance;

the splitter including a second distribution of thicknesses following a meridional path along the casing edge, the second distribution of thicknesses including a first thickness at 29% meridional distance, a maximum thickness between 40% and 45% thicker than the first thickness at between 60% and 70% meridional distance, and an ending thickness between 25% and 30% thicker than the first thickness from 90% meridional distance to 100% meridional distance;

the splitter including a third distribution of thicknesses following a meridional path along the bisection line, the third distribution of thicknesses including a first thickness at 27% meridional distance, a maximum thickness greater than 40% thicker than the first thickness at between 45% and 50% meridional distance, and an ending thickness greater than 10% thicker than the first thickness at 100% meridional distance.

8. The turbocharger of claim 1 further comprising a diffuser including a solidity and the solidity is less than 0.8.

9. The turbocharger of claim 1 wherein the recirculation passage of the casing includes a vane.

10. The turbocharger of claim 9 wherein the vane includes a camber line substantially parallel to the axis of rotation of the hub of the impeller.

11. A turbocharger for an internal combustion engine comprising:
a diffuser;
an impeller including a full blade having a leading edge, a splitter having a leading edge, and an axis of rotation;
a casing including a compressor inlet, an intake passage, a recirculation passage, a recirculation port, a bleed port, and an injection port, the intake passage containing the impeller in a gas flow path downstream from the compressor inlet and upstream from the diffuser, the leading edge of the full blade being upstream of the leading edge of the splitter, the bleed port being downstream of the leading edge of the full blade and upstream of the leading edge of the splitter, the injection port being downstream of the leading edge of the splitter, and the recirculation port being downstream of the compressor inlet, upstream of the impeller, and configured to enable gas to flow between the recirculation passage and the intake passage; and an active casing treatment configured to:
selectively control gas flowing through the bleed port, between the intake passage and the recirculation passage, and
selectively control gas flowing through the injection port, between the intake passage and the recirculation passage.

12. The turbocharger of claim 11 wherein the active casing treatment includes a casing sleeve.

13. The turbocharger of claim 12 further comprising a vane located in the recirculation passage.

14. The turbocharger of claim 13 wherein the vane includes a camber line substantially parallel to the axis of rotation of the impeller.

15. The turbocharger of claim 13 wherein the vane is located on the casing sleeve.

16. The turbocharger of claim 11 wherein the leading edge of the full blade is concave.

17. The turbocharger of claim 11 wherein the diffuser includes a solidity and the solidity is less than 0.8.

18. A turbocharger for an internal combustion engine, the turbocharger comprising a turbine and a compressor including an active casing treatment, the turbine comprising:
a hub that rotates about an axis of rotation;
a blade including a hub edge, an inlet edge, a casing edge, and an outlet edge, the blade coupled to the hub along the hub edge, the hub edge intersecting the leading edge, the leading edge intersecting the casing edge, the casing edge intersecting the hub edge;
the blade including a first distribution of angles, each angle measured between the axis of rotation and a mean line at the hub edge at a meridional distance along the hub edge, the first distribution of angles including a beginning angle of between 25 and 35 degrees where the inlet edge and the hub edge intersect, and an ending angle between −30 and −25 degrees where the outlet edge and the hub edge intersect;
the blade including a second distribution of angles, each angle measured between the axis of rotation and a mean line at the casing edge at a meridional distance along the casing edge, the second distribution of angles including a beginning angle of between 5 and 10 degrees where the inlet edge and the casing edge intersect, and an ending angle between −58 and −60 degrees where the outlet edge and the casing edge intersect.

19. The turbocharger of claim 18 wherein the blade includes a first distribution of thicknesses following a meridional projection along the hub edge, the hub edge intersecting the inlet edge at 0% meridional distance and intersecting the outlet edge at 100% meridional distance, the first distribution of thicknesses including a first thickness from between 0% meridional distance to 10% meridional distance, a maximum thickness greater than 400% thicker than the first thickness at between 60% and 70% meridional distance, and an ending thickness greater than 300% thicker than the first thickness at 100% meridional distance;
the blade including a bisection line between the hub edge and the casing edge and a second distribution of thicknesses following a meridional projection along the bisection line, the bisection line intersecting the inlet edge at 0% meridional distance and intersecting the outlet edge at 100% meridional distance, the second distribution of thicknesses including a first thickness from between 0% meridional distance to 10% meridional distance, a maximum thickness greater than 200% thicker than the first thickness at between 60% and 70% meridional distance, and an ending thickness greater than 100% thicker than the first thickness at 100% meridional distance;
the blade including a third thickness following a meridional path along the casing edge, the third thickness being substantially constant along the meridional path along the casing edge.

20. The turbocharger of claim 19 wherein the first thickness of the first distribution of thicknesses of the blade is within 0.2 mm of the third thickness of the blade.

* * * * *